US010506206B2

(12) United States Patent
Orlick et al.

(10) Patent No.: US 10,506,206 B2
(45) Date of Patent: Dec. 10, 2019

(54) THERMAL COMPENSATION IN IMAGE PROJECTION

(71) Applicant: Dolby Laboratories Licensing Corporation, San Francisco, CA (US)

(72) Inventors: Christopher John Orlick, Furlong, PA (US); Jerome D. Shields, Lumberton, NJ (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/572,153

(22) PCT Filed: May 6, 2016

(86) PCT No.: PCT/US2016/031311
§ 371 (c)(1),
(2) Date: Nov. 6, 2017

(87) PCT Pub. No.: WO2016/179542
PCT Pub. Date: Nov. 10, 2016

(65) Prior Publication Data
US 2018/0146176 A1    May 24, 2018

Related U.S. Application Data

(60) Provisional application No. 62/157,825, filed on May 6, 2015, provisional application No. 62/203,770, filed on Aug. 11, 2015.

(30) Foreign Application Priority Data

Sep. 18, 2015    (EP) .................................. 15185915

(51) Int. Cl.
*H04N 9/31*    (2006.01)
*G03B 21/20*    (2006.01)
(Continued)

(52) U.S. Cl.
CPC ....... *H04N 9/3144* (2013.01); *G02B 27/0025* (2013.01); *G03B 21/16* (2013.01);
(Continued)

(58) Field of Classification Search
CPC .. G03B 21/16; G03B 21/2053; G03B 21/206; G02B 27/0927; G09G 2320/041
See application file for complete search history.

(56) References Cited

U.S. PATENT DOCUMENTS 5,581,324 A    12/1996    Miyai
5,597,223 A *    1/1997    Watanabe .......... G02B 26/0833
349/61
(Continued)

FOREIGN PATENT DOCUMENTS

CN    1674655    9/2005
CN    1832581    9/2006
(Continued)

*Primary Examiner* — Brian P Yenke

(57) ABSTRACT

Apparatus for controlling a spatial light modulator (106) of an image projector (100), the image projector further comprising an illumination source (102) arranged to illuminate the spatial light modulator (106), the apparatus comprising an input (126) for receiving image data, an output for outputting image data and a controller (110) in communication with the input and the output, the controller (110) being configured to:
  determine an estimated thermal state of the projector;
  use at least the estimated thermal state of the projector to obtain an expected illumination pattern of light incident on the spatial light modulator (106) when illuminated by the illumination source (102);
  use the expected illumination pattern to adjust the received image data so as to compensate for thermal changes in one or more components of the image projector; and
  output the adjusted image data to the spatial light modulator (106).

15 Claims, 16 Drawing Sheets

(51) Int. Cl.
*G03B 21/16* (2006.01)
*G03B 27/00* (2006.01)
*G06T 5/00* (2006.01)
*G02B 27/09* (2006.01)
*G02B 27/00* (2006.01)

(52) U.S. Cl.
CPC ....... *G03B 21/206* (2013.01); *G03B 21/2053* (2013.01); *G06T 5/003* (2013.01); *H04N 9/3126* (2013.01); *H04N 9/3182* (2013.01); *H04N 9/3194* (2013.01); *G02B 27/0927* (2013.01)

(56) References Cited

U.S. PATENT DOCUMENTS

| | | | |
|---|---|---|---|
| 5,926,162 A * | 7/1999 | Wood | G09G 3/3648 345/101 |
| 6,433,351 B1 | 8/2002 | Yonekawa | |
| 6,747,629 B2 * | 6/2004 | Broker | G09G 3/18 219/679 |
| 6,806,871 B1 * | 10/2004 | Yasue | G02F 1/1345 257/7 |
| 6,862,012 B1 * | 3/2005 | Funakoshi | G09G 3/2092 345/101 |
| 6,882,480 B2 | 4/2005 | Yanagisawa | |
| 7,125,121 B2 | 10/2006 | Miyagaki | |
| 7,221,430 B2 | 5/2007 | Van Greevenbroek | |
| 7,403,264 B2 | 7/2008 | Jeunink | |
| 7,551,341 B1 | 6/2009 | Ward | |
| 7,684,007 B2 * | 3/2010 | Hull | B60Q 1/085 352/49 |
| 7,696,977 B2 * | 4/2010 | Lee | G09G 3/3648 345/101 |
| 7,777,945 B2 * | 8/2010 | Whitehead | H04N 9/3102 359/443 |
| 7,830,493 B2 | 11/2010 | Tinnemans | |
| 8,125,702 B2 * | 2/2012 | Ward | G03B 33/08 359/259 |
| 8,199,401 B2 * | 6/2012 | Ninan | H04N 9/3102 359/443 |
| 8,279,138 B1 | 10/2012 | Margulis | |
| 8,300,103 B2 * | 10/2012 | He | G03B 43/00 348/180 |
| 8,444,275 B2 * | 5/2013 | Kurtz | H04N 9/3105 353/85 |
| 8,454,172 B2 | 6/2013 | Fujinawa | |
| 8,687,026 B2 * | 4/2014 | Wurzel | G09G 3/3426 345/101 |
| 8,711,085 B2 * | 4/2014 | Ward | G09G 3/3413 345/102 |
| 8,854,604 B2 | 10/2014 | Deguenther | |
| 8,885,143 B2 | 11/2014 | Fischer | |
| 8,902,130 B2 | 12/2014 | Furuya | |
| 8,976,080 B2 * | 3/2015 | Richards | G09G 3/002 345/1.3 |
| 9,022,578 B2 * | 5/2015 | Nakanishi | G03B 21/16 348/747 |
| 9,039,200 B2 * | 5/2015 | Nobori | H04N 9/3155 353/85 |
| 9,091,909 B2 * | 7/2015 | Toyota | G03B 21/16 |
| 9,134,594 B2 * | 9/2015 | Kim | G03B 21/14 |
| 9,198,253 B2 * | 11/2015 | Watanabe | G03B 21/16 |
| 9,433,064 B2 * | 8/2016 | Miyamoto | H04N 9/3144 |
| 9,607,556 B2 * | 3/2017 | Atkins | G09G 3/36 |
| 9,674,494 B2 * | 6/2017 | Terasaki | H04N 9/3144 |
| 9,679,439 B2 * | 6/2017 | Walker | G07F 17/3244 |
| 9,686,447 B2 * | 6/2017 | Komiyama | H04N 5/05 |
| 2003/0107546 A1 * | 6/2003 | Ham | G09G 3/3648 345/101 |
| 2004/0070562 A1 * | 4/2004 | Hudson | G09G 3/3696 345/101 |
| 2004/0196233 A1 * | 10/2004 | Shimizu | G09G 3/3648 345/89 |
| 2004/0196303 A1 * | 10/2004 | Matsuda | H04N 9/3182 345/690 |
| 2005/0162737 A1 * | 7/2005 | Whitehead | H04N 9/3102 359/454 |
| 2005/0179854 A1 | 8/2005 | Sekine | |
| 2005/0248524 A1 * | 11/2005 | Feng | G09G 3/3413 345/102 |
| 2006/0202945 A1 * | 9/2006 | Feng | G09G 3/342 345/102 |
| 2007/0086495 A1 * | 4/2007 | Sprague | H01S 5/06804 372/38.02 |
| 2007/0115440 A1 * | 5/2007 | Wiklof | G03B 21/14 353/69 |
| 2007/0146293 A1 * | 6/2007 | Leo | G09G 3/3648 345/101 |
| 2007/0176851 A1 | 8/2007 | Willey | |
| 2007/0195270 A1 * | 8/2007 | Hull | B60Q 1/085 352/49 |
| 2008/0018985 A1 * | 1/2008 | Whitehead | H04N 9/3102 359/298 |
| 2008/0036727 A1 * | 2/2008 | Muto | G09G 3/3611 345/101 |
| 2008/0180643 A1 * | 7/2008 | Endo | G03B 21/10 353/38 |
| 2008/0212105 A1 * | 9/2008 | Restaino | G01M 11/0271 356/521 |
| 2009/0002641 A1 * | 1/2009 | Hsu | G03B 21/16 353/52 |
| 2009/0009729 A1 * | 1/2009 | Sakai | G03B 21/16 353/57 |
| 2009/0028199 A1 * | 1/2009 | Brown | H01S 5/06804 372/38.01 |
| 2009/0091718 A1 * | 4/2009 | Obi | G03B 21/56 355/30 |
| 2009/0184901 A1 * | 7/2009 | Kwon | G09G 3/3233 345/77 |
| 2009/0225234 A1 * | 9/2009 | Ward | G03B 33/08 348/744 |
| 2010/0007577 A1 * | 1/2010 | Ninan | H04N 9/3102 345/1.3 |
| 2010/0052575 A1 * | 3/2010 | Feng | G09G 3/3426 315/308 |
| 2010/0214271 A1 * | 8/2010 | Mizusako | G09G 3/3648 345/204 |
| 2011/0234989 A1 * | 9/2011 | Kudo | G03B 21/16 353/52 |
| 2011/0242496 A1 * | 10/2011 | Kimoto | G03B 21/16 353/31 |
| 2011/0273495 A1 * | 11/2011 | Ward | G09G 3/3413 345/694 |
| 2011/0292505 A1 * | 12/2011 | Kurtz | G02B 7/028 359/489.14 |
| 2012/0038693 A1 | 2/2012 | Kang | |
| 2012/0038892 A1 * | 2/2012 | Kurtz | H04N 9/3105 353/31 |
| 2012/0050606 A1 * | 3/2012 | Debevec | G03B 15/07 348/370 |
| 2012/0188348 A1 * | 7/2012 | Umeda | G09G 3/003 348/54 |
| 2012/0212707 A1 * | 8/2012 | Richards | G09G 3/20 353/30 |
| 2012/0229494 A1 * | 9/2012 | Kobayashi | G09G 5/397 345/589 |
| 2012/0320342 A1 * | 12/2012 | Richards | G09G 3/002 353/30 |
| 2013/0011078 A1 * | 1/2013 | Phan | G06T 3/4053 382/279 |
| 2013/0057808 A1 * | 3/2013 | Mizusako | G09G 3/3648 349/72 |
| 2013/0070208 A1 * | 3/2013 | Nakanishi | G03B 21/16 353/31 |
| 2013/0088688 A1 * | 4/2013 | Read | G02B 27/286 353/8 |
| 2013/0107220 A1 * | 5/2013 | Furukawa | G03B 21/16 353/20 |
| 2013/0136151 A1 | 5/2013 | Chung | |

(56) References Cited

U.S. PATENT DOCUMENTS

| | | |
|---|---|---|
| 2013/0235361 A1 | 9/2013 | Baselmans |
| 2014/0055692 A1* | 2/2014 | Kroll ................. G02F 1/134309 349/15 |
| 2014/0192331 A1* | 7/2014 | Toyooka .............. G03B 21/006 353/85 |
| 2014/0293134 A1* | 10/2014 | Hung .................... H04N 5/205 348/624 |
| 2014/0327892 A1 | 11/2014 | Walter |
| 2015/0022792 A1 | 1/2015 | Gorkhover |
| 2015/0091799 A1* | 4/2015 | Wu .......................... H04N 5/63 345/158 |
| 2015/0187246 A1* | 7/2015 | Yoshizawa ............... G09G 3/18 345/207 |
| 2015/0212399 A1* | 7/2015 | Lin ........................ G03B 21/16 353/57 |
| 2015/0309400 A1* | 10/2015 | Kawamura ........ G03B 21/2013 353/31 |
| 2016/0277044 A1* | 9/2016 | Song ........................ H04B 1/04 |
| 2017/0003532 A1* | 1/2017 | Kondoh ............... G09G 3/3611 |

FOREIGN PATENT DOCUMENTS

| | | |
|---|---|---|
| CN | 101063799 | 10/2007 |
| CN | 101201547 | 6/2008 |
| CN | 102104760 | 6/2011 |
| CN | 102918578 | 2/2013 |
| CN | 103091993 | 2/2015 |
| DE | 102010044969 | 3/2012 |
| EP | 2869570 | 5/2015 |
| JP | 2009-225119 | 10/2009 |
| JP | 2013-178344 | 9/2013 |
| WO | 2015/023762 | 2/2015 |
| WO | 2015/054032 | 4/2015 |
| WO | 2015/054797 | 4/2015 |

* cited by examiner

| Block 0 | Block 1 | Block 2 | Block 3 | Block 4 | Block 5 | Block 6 | Block 7 |
| --- | --- | --- | --- | --- | --- | --- | --- |
| Block 8 | Block 9 | Block 10 | Block 11 | Block 12 | Block 13 | Block 14 | Block 15 |
| Block 16 | Block 17 | Block 18 | Block 19 | Block 20 | Block 21 | Block 22 | Block 23 |
| Block 24 | Block 25 | Block 26 | Block 27 | Block 28 | Block 29 | Block 30 | Block 31 |

FIG. 6

THERMAL COMPENSATION IN IMAGE PROJECTION

CROSS-REFERENCE TO RELATED APPLICATIONS

The present invention claims the benefit of U.S. Provisional Patent Application No. 62/157,825, filed on May 6, 2015; U.S. Provisional Patent Application No. 62/203,770, filed on Aug. 11, 2015; and European Patent Application No. 15185915 filed on Sep. 18, 2015, each of which are hereby incorporated by reference in their entirety.

BACKGROUND OF THE INVENTION

Technical Field

This invention relates generally to thermal compensation, and more particularly to thermal compensation in image projectors.

Background

Improved contrast can be achieved in a projection system by modulating the illumination light incident on the spatial light modulators (SLMs) of the projection system. For example, if a pixel of an SLM is to display 5% brightness and is illuminated at full brightness (100%), then the pixel must attenuate 95% of the illumination light. Light leakage inherent in most SLMs makes it difficult to achieve dark levels when significant attenuation is required. On the other hand, if the pixel is illuminated at 10% brightness, then the pixel need only attenuate 50% of the incident light to achieve a 5% brightness level, and light leakage by the pixel is much less significant.

In order for the pixel to achieve accurate display levels, the intensity of the light incident on the pixel must be known with a high degree of precision. If the intensity of the incident light varies from the expected intensity, the output of the pixel will also vary, thereby degrading the quality of the projected image.

SUMMARY

Projectors require a significant amount of energy during operation, especially projectors for venues with large screens. High brightness projectors further increase the light energy requirements. The dissipation of energy in such projectors generates a significant amount of heat, which the inventors have determined causes physical changes in the components of the projector. The inventors have also determined that the physical changes in the components of the projector can affect the intensity of light incident on the pixels of light modulator(s) in the projectors and degrade the quality of the projected image.

The present invention overcomes the problems associated with the prior art by providing a projector capable of compensating for thermal changes in the components of the projector. The invention facilitates more precise lightfield modeling and, therefore, higher quality projected images.

An example image projector includes an image data input, a controller, a light source, illumination optics, an imaging spatial light modulator (SLM), and imaging optics. The image data input receives image data. The controller is coupled to receive the image data and is operative to determine a thermal state of the image projector. The controller also adjusts the image data depending on the thermal state of the image projector to generate thermally adjusted image data. The light source is operative to emit an illumination beam. The illumination optics are disposed in the path of the illumination beam and operative to convert the illumination beam into a lightfield. The imaging spatial light modulator is coupled to receive the thermally adjusted image data from the controller, is disposed to receive the lightfield, and is operative to modulate the lightfield responsive to the thermally adjusted image data to generate an imaging beam. The imaging optics are disposed in the path of the imaging beam and operative to focus the imaging beam on a viewing surface.

The light source includes a plurality of individual emitters. In a particular embodiment, the individual emitters are separately controllable. In an even more particular embodiment, the individual emitters are pixels of an illumination spatial light modulator (SLM) coupled to receive illumination data from the controller and operative to modulate the illumination beam depending on the illumination data. The controller is operative to generate the illumination data from the image data and provide the illumination data to the illumination SLM. In addition, the controller is operative to update the thermal state of the image projector, based at least in part on the illumination data, and adjust the image data depending on the updated thermal state of the image projector to generate the thermally adjusted image data.

In an example embodiment, a set of thermal sensors is coupled to provide temperature data to the controller. The thermal state of the image projector is determined by the controller based at least in part on the temperature data. The projector includes an air intake for drawing air into the image projector to cool the image projector, and at least one of the thermal sensors is disposed to sense the temperature of the air drawn into the image projector. Another of thermal sensors is disposed to sense the temperature within the light source. Yet another of the thermal sensors is coupled to an optics mount of the illumination optics. The thermal state of the image projector is determined by the controller based at least in part on content of the image data and, optionally, on the input from the thermal sensors.

In an example embodiment, the thermal state of the image projector is determined by the controller based at least in part on a prior thermal state of the image projector. The thermal state of the image projector is also determined by the controller based at least in part on content of the image data. For example, the thermal state of the image projector is determined by the controller based at least in part on an average of intensity values of the image data. The controller employs a temporal filter to determine the thermal state of the image projector.

In example embodiments, the light source includes a plurality of emitters. The emitters are divided into groups, and each group is associated with a corresponding portion of the lightfield. The thermal state of the image projector includes a separate thermal state for each group of the emitters. Optionally, the thermal state of the image projector includes a plurality of thermal states for each group of the emitters. The emitters are pixels of a spatial light modulator, and the controller is operative to determine the separate thermal state(s) for each group of emitters based at least in part on the separate thermal states of adjacent groups of the emitters.

In an example embodiment, the controller is configured to adjust the image data depending on the thermal state of the projector by creating a model of the lightfield, based at least in part on the thermal state of the image projector, and adjusting the image data based on the model of the lightfield. The light source includes a plurality of individual emitters, and the controller is configured to select a point spread function associated with each of the individual emitters based on the thermal state of the projector. The controller then convolves the selected point spread functions to create the model of the lightfield. Shapes of the point spread functions vary depending on the thermal state of the image projector. In addition, positions of the point spread functions vary depending on the thermal state of the image projector.

Creating the model of the lightfield based at least in part on the thermal state of the image projector also includes creating a different color specific model of the lightfield for each of a plurality of different colors depending on the thermal state of the projector. The controller is configured to select the point spread functions based at least in part on the different colors.

In an example embodiment wherein the emitters are divided into groups, each group is associated with a corresponding portion of the lightfield. The thermal state of the image projector includes a separate thermal state for each group of the emitters, and the point spread functions are selected based on which particular group a corresponding emitter is a member of and also based on the separate thermal state associated with the particular group. Optionally, the thermal state of the image projector includes at least two separate thermal states for each group of the emitters. The controller selects a point spread function of a particular shape depending on a first of the thermal states associated with an emitter's group, and the controller determines a displacement of the selected point spread function depending on a second of the thermal states associated with the emitter's group. In addition, the plurality of emitters includes pixels of an illumination SLM, and the point spread functions are selected based at least in part on illumination data provided to the illumination SLM by the controller.

Example embodiments of the image projector include a plurality of predefined thermal states spanning the operating temperature range of the projector. The controller is configured to determine thermal states of the image projector by selecting ones of the predefined thermal states.

Optionally, the thermal state of the projector is updated responsive to every frame of the image data.

An example method of driving a spatial light modulator in a projector is also disclosed. The method includes receiving image data to be displayed by the spatial light modulator (SLM) and determining a thermal state of the projector. The method further includes adjusting the image data based on the thermal state of the projector to generate thermally adjusted image data and providing the thermally adjusted image data to the SLM. The method further includes generating illumination data based on the image data, and providing the illumination data to a light source configured to illuminate the SLM based on the illumination data. The method further includes updating the thermal state of the projector based on the illumination data to generate an updated thermal state of the projector and adjusting subsequent image data based on the updated thermal state of the projector.

A particular example method includes receiving temperature data from a thermal sensor set. Then, determining the thermal state of the projector includes determining the thermal state of the projector based at least in part on the temperature data. Receiving the temperature data from the thermal sensor set includes receiving temperature data indicative of the temperature of ambient air flowing into the projector. Receiving the temperature data from the thermal sensor set also includes receiving temperature data indicative of the temperature of a component of a light source configured to illuminate the SLM. Receiving the temperature data from the thermal sensor set also includes receiving temperature data indicative of the temperature of optics disposed between the SLM and a light source configured to illuminate the SLM. In addition, determining the thermal state of the projector includes determining the thermal state of the projector based at least in part on content of the image data.

In an example method, determining the thermal state of the projector includes determining the thermal state of the projector based at least in part on content of the image data and/or determining the thermal state of the projector based at least in part on a prior thermal state of the image projector. In addition, determining the thermal state of the projector further includes receiving temperature data from a thermal sensor set and determining the thermal state of the projector based at least in part on the temperature data. Determining the thermal state of the projector also includes temporal filtering and determining the thermal state of the projector based at least in part on average intensity values of the image data.

In an example method, determining the thermal state of the projector includes defining groups of individual emitters illuminating the SLM and determining a separate thermal state for each of the groups of individual emitters. Determining the thermal state of the projector can also include determining a plurality of separate thermal states for each of the groups of individual emitters. Defining groups of individual emitters illuminating the SLM includes defining blocks of pixels of an illuminating spatial light modulator. Optionally, determining the separate thermal state for each of the groups of individual emitters includes determining the separate thermal state for each of the groups of individual emitters based at least in part on the separate thermal states of adjacent groups of the emitters.

In a particular example method, adjusting the image data based on the thermal state of the projector includes determining characteristics of an illuminating lightfield incident on the SLM based at least in part on the thermal state of the projector and, then, adjusting the image data based on the characteristics of the illuminating lightfield. In addition, determining characteristics of the illuminating lightfield includes selecting a point spread function associated with each of a plurality of emitters illuminating the SLM based on the thermal state of the projector and convolving the selected point spread functions to create a model of the illuminating lightfield. Shapes and positions of the point spread functions vary depending on the thermal state of the projector.

In a more particular example method, determining characteristics of the illuminating lightfield includes creating a different color specific model of the lightfield for each of a plurality of different colors depending on the thermal state of the projector. Selecting the point spread functions includes selecting the point spread functions based at least in part on the different colors.

In an example method, selecting a point spread function associated with each of the plurality of emitters includes defining groups of the emitters, each group being associated with a corresponding portion of the illuminating lightfield. Determining a thermal state of the projector includes determining a separate thermal state for each group of the emitters. In addition, selecting the point spread functions includes selecting the point spread functions depending on which particular group a corresponding emitter is a member of and also depending on a separate thermal state associated with the particular group. Optionally, in the example method, determining the thermal state of the projector includes determining at least two separate thermal states for each group of emitters. Determining characteristics of the illuminating lightfield includes selecting a point spread function of a particular shape depending on a first of the thermal states associated with an emitter's group and determining a displacement of the selected point spread function depending on a second of the thermal states associated with the emitter's group.

In an example method, the plurality of emitters include pixels of an illumination SLM, and selecting the point spread functions includes selecting the point spread functions depending at least in part on illumination data provided to the illumination SLM.

Example methods also include updating the thermal state of the projector each time a frame of the image data is received.

In some example methods, determining the thermal state of the projector includes receiving a plurality of predefined thermal states spanning the operating temperature range of the projector and selecting particular ones of the predefined thermal states.

Another example image projector includes an image data input for receiving image data, a light source operative to emit an illumination beam, and illumination optics disposed in the path of the illumination beam and operative to convert the illumination beam into a lightfield. In addition, the example image projector includes means for adjusting the image data based on a thermal state of the projector to generate thermally adjusted image data and an imaging spatial light modulator coupled to receive the thermally adjusted image data. The imaging spatial light modulator is disposed to receive the lightfield and is operative to modulate the lightfield responsive to the thermally adjusted image data to generate an imaging beam. Imaging optics are disposed in the path of the imaging beam and operative to focus the imaging beam on a viewing surface.

An example non-transitory, electronically-readable medium is also disclosed, The non-transitory electronically readable medium has code embodied therein which, when executed by a processor, will cause an electronic device to receive image data to be displayed by a spatial light modulator (SLM), determine a thermal state of a projector, adjust the image data based on the thermal state of the projector to generate thermally adjusted image data, and provide the thermally adjusted image data to the SLM.

An example system for configuring a projector for thermal compensation is also disclosed. The example system includes memory for storing data and code and an image data source configured to provide thermally stabilizing image data and test image data to the projector. The thermally stabilizing image data defines stabilizing images for stabilizing the projector in particular thermal states. The test image data defines one or more test images. The system additionally includes an image capture device configured to capture the test image(s) projected by the projector and a controller. The controller is operative to cause the projector to display a first one of the stabilizing images for a time sufficient to stabilize the projector in a first one of the thermal states, to cause the projector to display a test image when the projector is in the first one of the thermal states, and to cause the image capture device to capture an image of the test image projected by the projector when the projector is in the first one of the thermal states. The controller is additionally operative to cause the projector to display a second one of the stabilizing images for a time sufficient to stabilize the projector in a second one of the thermal states, cause the projector to display the test image when the projector is in the second one of the thermal states, and cause the image capture device to capture an image of the test image projected by the projector when the projector is in the second one of the thermal states. The controller is also operative to analyze the captured test images to determine changes in an illumination source of the projector associated with the second thermal state relative to the first thermal state and to store a record in the memory associating the changes with the second thermal state.

In the example system, certain ones of the stabilizing images each defines a particular uniform intensity across an entire image. The particular uniform intensity is a percentage of maximum brightness that corresponds to a particular one of the thermal states.

Optionally, at least one of the stabilizing images defines a different uniform intensity for multiple regions across an image. Each the uniform intensity is a percentage of maximum brightness that corresponds to a particular one of the thermal states associated with each of the regions.

In the example system, the record associating the changes with the second thermal state includes data indicative of characteristics of a point spread function associated with a light source of the projector. The data indicative of the point spread function includes data indicative of a shape of the point spread function and/or data indicative of a displacement of the point spread function.

An example method of configuring a projector for thermal compensation is also disclosed. The example method includes placing the projector in a first thermal state, causing the projector to display a test image while in the first thermal state, and capturing the test image displayed while the projector is in the first thermal state. The example method additionally includes placing the projector in a second thermal state, causing the projector to display a test image while in the second thermal state, and capturing the test image displayed while the projector is in the second thermal state. The example method additionally includes analyzing the captured test images to determine changes in an illumination source of the projector associated with the second thermal state relative to the first thermal state and generating configuration data associating the changes with the second thermal state.

A more detailed example method includes placing the projector in additional thermal states, causing the projector to display a test image while in each of the additional thermal states, and capturing the test images while the projector is in each of the additional thermal states. The method additionally includes analyzing the captured test images to determine changes in the illumination source of the projector associated with the additional thermal states relative to the first thermal state and generating configuration data associating the changes with the additional thermal states.

In a particular example method, the step of placing the projector in the first thermal state includes causing the projector to display a first predetermined image for a time sufficient to place the projector in the first thermal state. The first predetermined image includes a first spatially constant intensity level corresponding to the first thermal state. In addition, the step of placing the projector in the second thermal state includes causing the projector to display a second predetermined image for a time sufficient to place the projector in the second thermal state. The first predetermined image includes an average intensity level corresponding to the first thermal state, and the second predetermined image includes an average intensity level corresponding to the second thermal state.

In one example method, the step of analyzing the captured test images includes determining a point spread function for each of a group of emitters of the illumination source.

In a particular example method, the step of analyzing the captured test images includes determining a first point spread function associated with the first thermal state for each of the emitters and determining a second point spread function associated with the second thermal state for each of the emitters. The step of generating configuration data includes storing the first point spread functions in association with the emitters and the first thermal state and storing the second point spread functions in association with the emitters and the second thermal state.

The step of analyzing the captured test images optionally includes determining displacements of the second point spread functions relative to corresponding ones of the first point spread functions.

An example configuration method additionally includes receiving input from thermal sensors associated with the projector and defining the thermal states based at least partially on the input.

The example configuration methods further include providing the configuration data to the projector.

BRIEF DESCRIPTION OF THE DRAWINGS

The present invention is described with reference to the following drawings, wherein like reference numbers denote substantially similar elements:

FIG. 6 is a block diagram representing blocks of emitters associated with a lightfield;

DETAILED DESCRIPTION

The present invention overcomes the problems associated with the prior art, by providing thermal compensation in an image projector. In the following description, numerous specific details are set forth (e.g., type of illumination source, dual modulation, example sensor positions, etc.) in order to provide a thorough understanding of the invention. Those skilled in the art will recognize, however, that the invention may be practiced apart from these specific details. In other instances, details of well-known image projection practices (e.g., image data processing, projector assembly, modulator timing, etc.) and components (optics, electronic circuits, etc.) have been omitted, so as not to unnecessarily obscure the present invention.

Figure 1:
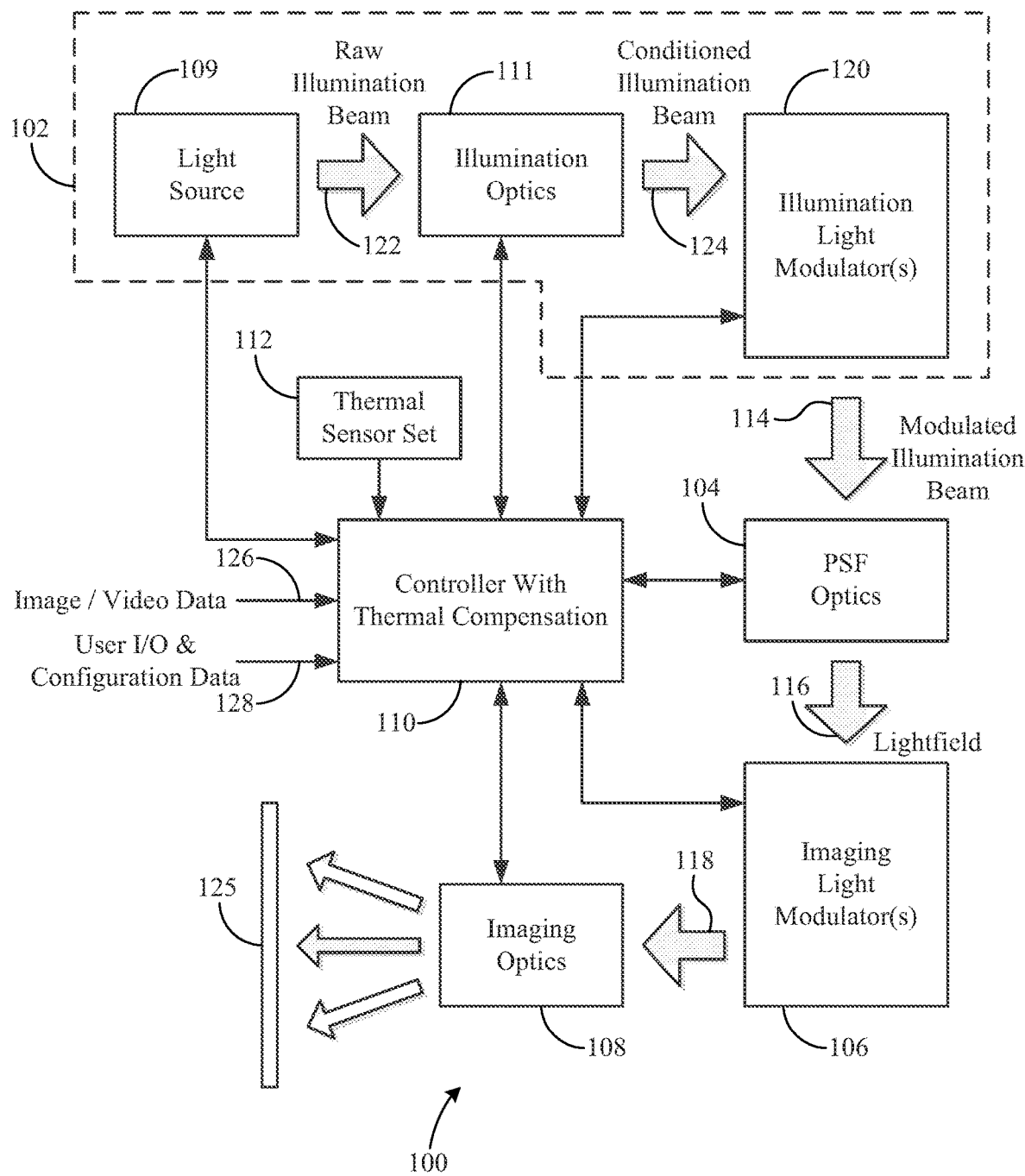
FIG. 1 is a block diagram of an image projector with thermal compensation capabilities.

FIG. 1 is a block diagram of an image projector 100 with thermal compensation capabilities. Image projector 100 includes an illumination source 102, point spread function (PSF) optics 104, imaging light modulator(s) 106, imaging optics 108, a controller 110, and a thermal sensor set 112.

In this particular example embodiment, projector 100 is a dual modulation projector. Dual modulation increases the dynamic range of projector 100. For example, the pixels of imaging light modulator 106 that are displaying darker areas of an image are illuminated with less intense light, thereby decreasing the amount of required attenuation by imaging light modulator(s) 106. As a result, the light output of dark pixels is closer to 0%, which improves the dynamic range of projector 100.

Illumination source 102 includes a plurality of individually controllable emitters, which facilitate the emission of a modulated illumination beam 114. In this example embodiment, illumination source 102 includes a light source 109, illumination optics 111, and illumination light modulator(s) 120. Light source 109 generates a raw illumination beam 122 and directs raw illumination beam 122 toward illumination optics 111. Illumination optics 111 conditions the raw illumination beam to generate a conditioned illumination beam 124 and directs conditioned illumination beam 124 to evenly impinge on illumination light modulators 120. Illumination light modulator(s) 120 is/are spatial light modulator(s) SLM(s), which modulate conditioned illumination beam 124 to produce modulated illumination beam 114 responsive to illumination data provided by controller 110.

In this example embodiment, the individually controllable emitters of illumination source 102 are pixels (or groups of pixels) of illumination light modulator(s) 120, which is/are digital micro-mirror device(s) (DMD(s)). However, those skilled in the art will recognize that this particular element (as well as other described elements, even if not explicitly stated) is not an essential element of the present invention. For example, the present invention can be practiced with alternate SLMs including, but not limited to, liquid crystal arrays. Indeed, the invention can be practiced with alternate multi-point light sources including, but not limited to, arrays of light emitting diodes (LEDs), multiple incandescent bulbs, multiple arc lamps, and so on.

PSF optics 104 receives modulated imaging beam 114 and blurs the point spread functions (PSFs) of the light from the individual emitters of illumination light modulator(s) 120 to illuminate imaging light modulator(s) 106 with a lightfield 116. Although shown as a beam transmitted from PSF optics 104 to imaging light modulator(s) 106 for illustrative purposes, lightfield 116 is more accurately described as the light impinging on the modulating surface(s) of imaging light modulator(s) 106.

Imaging light modulator(s), responsive to thermally compensated image data from controller 110, modulate(s) lightfield 116 to infuse an imaging beam 118 with an image corresponding to the image data, and directs imaging beam 118 to imaging optics 108. Imaging optics 108 focuses imaging beam 118 on a viewing surface 125, where the projected images can be viewed (e.g., on a movie theater screen).

Controller 110 receives image/video data from a source (not shown) via data input 126, adjusts the image data depending on a current thermal state of projector 100, and provides the thermally adjusted image data to imaging light modulator(s) 106. In the example embodiment, controller 110 determines the thermal state of projector 100 based on configuration data received via a user input/output and configuration terminal set 128, temperature data received from thermal sensor set 112, and the content (e.g., intensity values) of the image/video data.

Thermal states are predefined to span the operating temperature range of projector 100. For example, the thermal state associated with the coldest operating temperature of projector 100 can be defined as 0.0, and the thermal state associated with the warmest operating temperature of projector 100 can be defined as 1.0. Intermediate thermal states can then be defined across the operating temperature range at increments of 0.1. Once the thermal states are defined, changes in lightfield 116 (e.g., PSF shape changes, displacements, etc.) can be associated with the particular thermal states. Then, the current thermal state of projector 100 at any particular time can be used to more accurately model lightfield 116.

As will be described in greater detail, controller 110 uses current thermal states to more accurately model lightfield 116 and adjusts the image data based on that model. For example, if controller 110 determines that due to the current thermal state of projector 100 the intensity of lightfield 116 on a particular pixel of imaging light modulator(s) 106 is increased, then controller 110 will reduce the intensity value of the image data provided to that pixel. The reduced intensity value of the adjusted image data causes the pixel to attenuate the incident light to a greater degree, thereby offsetting the increase in intensity of lightfield 116 on the pixel. Similarly, if controller 110 determines that due to the current thermal state of projector 100 the intensity of lightfield 116 on a particular pixel of imaging light modulator(s) 106 is decreased, then controller 110 will increase the intensity value of the image data provided to that pixel. The increased intensity value of the adjusted image data causes the pixel to attenuate the incident light to a lesser degree, thereby offsetting the decrease in intensity of lightfield 116 on the pixel.

In alternate embodiments, in addition to or instead of adjusting the video data provided to imaging light modulator(s), controller 110 can reduce artifacts caused by thermal changes in projector 100 by providing control signals to one or more of illumination source 102, PSF optics 104, and imaging optics 108. For example, if a current thermal state of projector 100 indicates that a portion of lightfield 116 will be too intense or not intense enough, controller 110 can adjust the illumination data provided to illumination light modulator(s) 120 to correct the intensity of that portion of lightfield 116.

A more complete discussion of lightfield modeling is provided in WO/2015/023762, entitled Systems and Methods for Light Field Modeling Techniques for Multi-Modulation Displays, which is incorporated herein by reference in its entirety.

Figure 2:
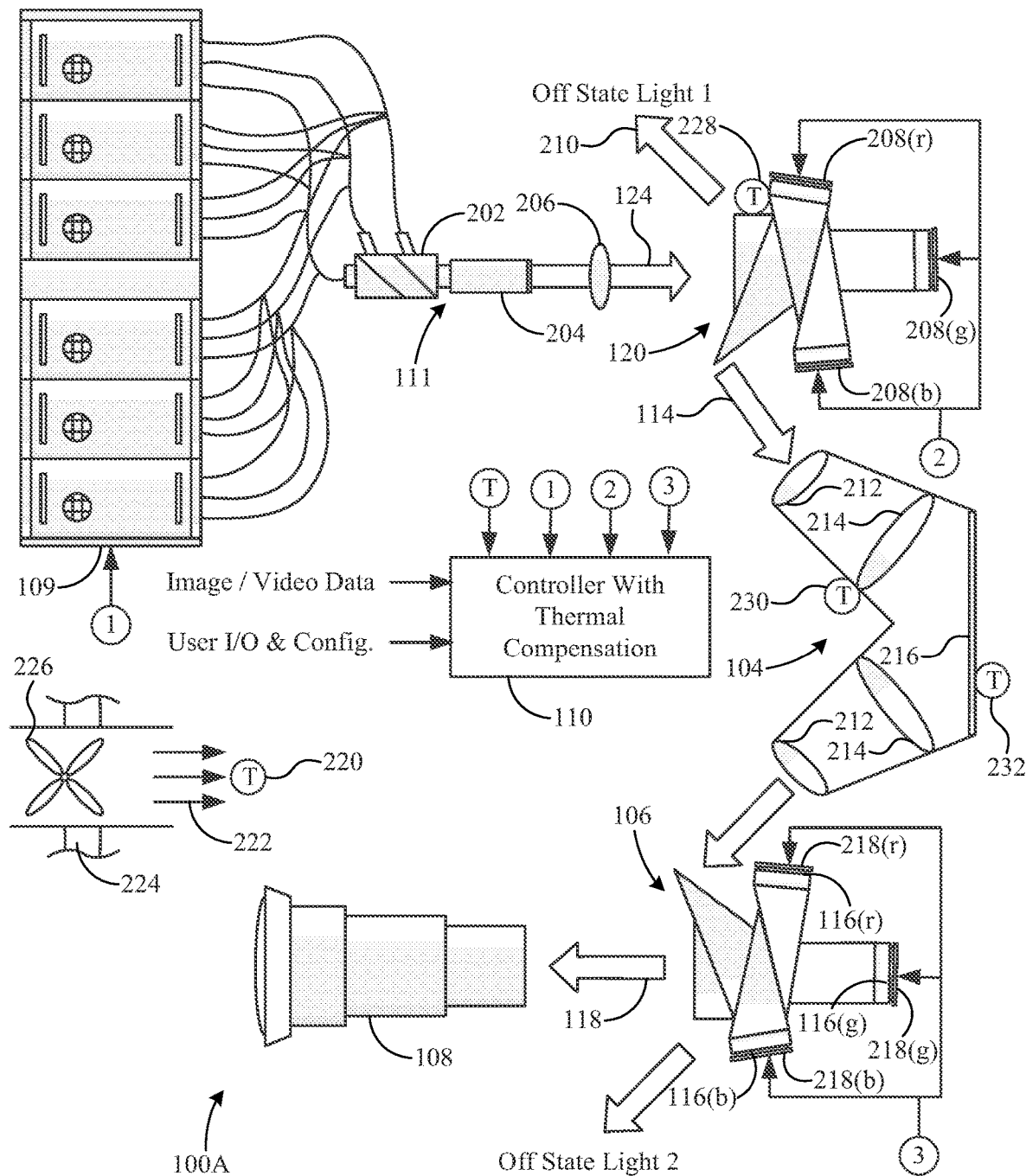
FIG. 2 shows an example physical embodiment of the projector of FIG. 1.

FIG. 2 is a diagram of an example physical embodiment of projector 100 as projector 100A. Corresponding elements are labeled with the same indices as in FIG. 1.

In this embodiment, light source 109 includes a plurality of lasers that provide three different colors of light (e.g., red, green, and blue) to illumination optics 111. Illumination optics 111 includes a combiner 202, an integrating rod 204, and a diffuser 206. Combiner 202 combines the different colored light into a single white beam. Integrating rod 204 improves the uniformity of the white light, and diffuser 206 introduces angular diversity into the light.

Illumination light modulators 120 are embodied in an RGB prism (also known as a Philips prism). The RGB prism includes a plurality of prisms and a plurality of reflective SLMs (e.g., DMDs) 208(r), 208(g), and 208(b). The prisms divide the white, conditioned illumination beam 124 into constituent red, green, and blue beams, and directs each colored beam to a corresponding one of reflective SLMs 208(r), 208(g), and 208(b). SLMs 208 modulate the colored beams to infuse each colored beam with an illumination pattern (e.g., a half-tone image) based on illumination data from controller 110. SLMs 208 reflect the modulated colored beams back into the prisms, which recombine the modulated colored beams to form modulated illumination beam 114 and direct modulated illumination beam 114 into PSF optics 104. Off state light 210, which results from the attenuation of the colored illumination beams, is reflected in a direction away from modulated illumination beam 114.

PSF optics 104 includes lenses 212, diffusers 214, and a reflector 216. Together, lenses 212, diffusers 214, and reflector 216 provide a desired defocusing of the half-tone images carried by modulated illumination beam 114, and direct the modulated, defocused illumination beam into imaging light modulators 106.

Imaging light modulators 106 are also embodied in an RGB prism. The prisms divide the defocused, modulated illumination beam in red, green, and blue components and direct each of the red, green, and blue components to a respective one of SLMs 218(r), 218(g), and 218(b). PSF optics 104 directs the modulated, defocused imaging beam into imaging light modulators 106, so that colored components (r, g, and b) of the defocused half-tone image are each incident on a corresponding one of SLMs 218(r), 218(g), and 218(b) as colored components 116(r), 116(g), and 116(b) of lightfield 116. Responsive to thermally adjusted image data received from controller 110, SLMs 218 modulate the incident lightfields 116 (r, g, b) and reflect the modulated light back into the prisms, which recombine the modulated colored light to form imaging beam 118. Imaging optics 108 is a projection lens that focuses imaging beam 118 onto display surface 125.

In the example physical embodiment of FIG. 2, thermal sensor set 112 (FIG. 1) includes a plurality of individual sensors disposed in different locations. One thermal sensor 220 is disposed in the path of cooling air 222 forced through a wall 224 of projector 100A by a cooling fan 226. Data from sensor 220 is indicative of the temperature of ambient air surrounding projector 100A. Another temperature sensor 228 is in thermal contact with a prism of illumination light modulators 120 near the off state light exit. Data from sensor 228 is indicative of the temperature of the RGB prism of illumination light modulator 120. Yet another temperature sensor 230 is in thermal contact with an optical mount of PSF optics 104. Data from sensor 230 is indicative of the temperature of lenses 212 and/or diffusers 214. A fourth temperature sensor 232 is in thermal contact with the back side of reflector 216 and provides data indicative of the temperature of reflector 216. Sensors 220, 228, 230, and 232 thus provide a means of modeling effects on the thermal state of projector 100A by conditions not directly dependent on the content of the image data.

Figure 3:
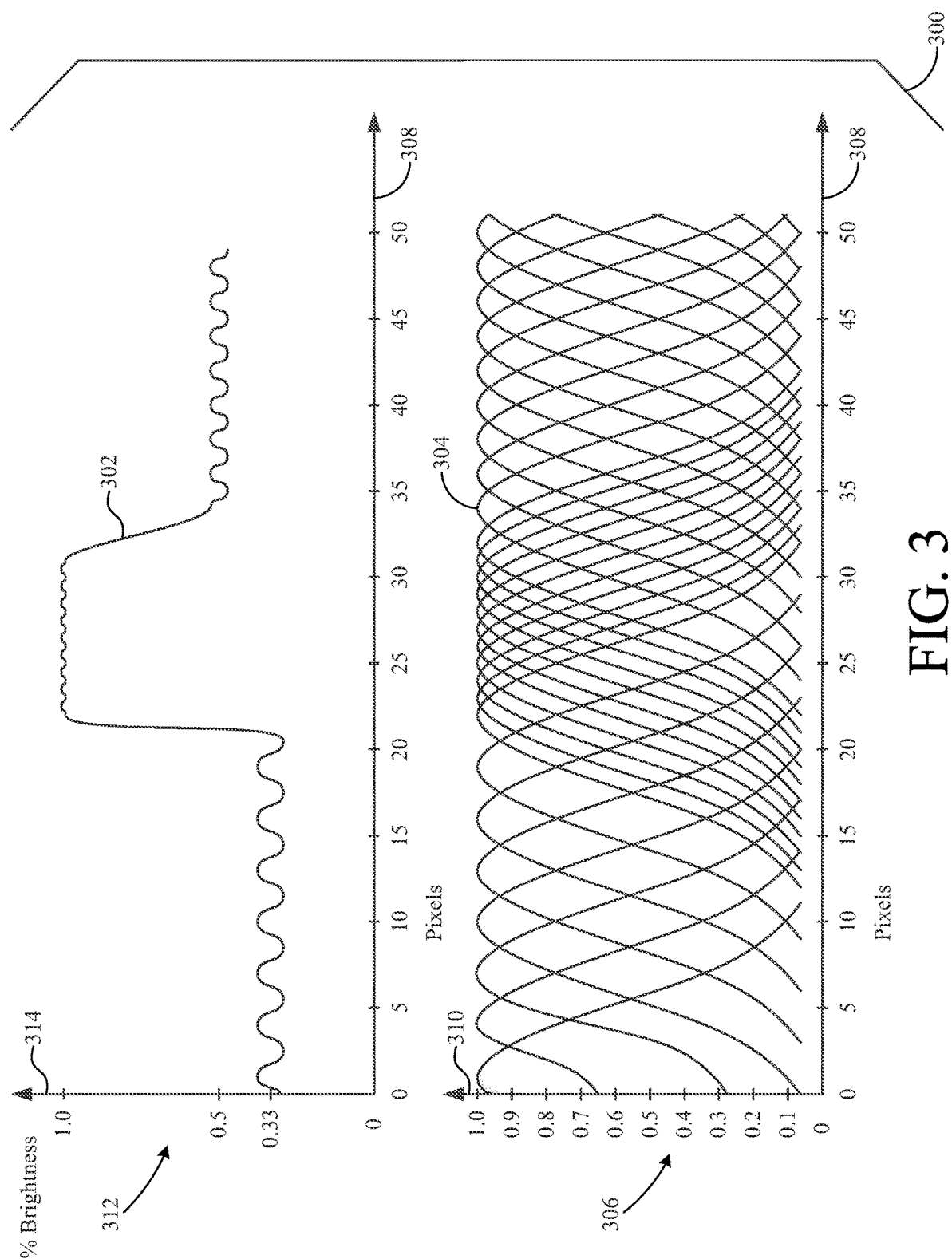
FIG. 3 is a compound graph showing an example lightfield generated by a plurality of point spread functions.

FIG. 3 is a compound graph 300 showing qualitatively how an example lightfield 302 depends on a plurality of point spread functions (PSFs) 304. Although lightfield 302 is shown only in one dimension for simplicity, it should be understood that lightfield 302 extends in two dimensions, for example across the surface of an imaging light modulator. The lower portion 306 of graph 300 shows the point spread functions 304 individually. Each of PSFs 304 is associated with an individual emitter of an illumination source, and represents the light intensity incident on a surface from the associated emitter. The horizontal axis represents distance in pixels of an SLM upon which lightfield 302 is incident. The vertical axis 310 represents the percentage of maximum brightness of a single emitter.

The upper portion 312 of graph 300 shows the intensity of lightfield 302 resulting from the convolution of the individual PSFs 304. The horizontal axis 308 is the same as for the lower portion 306 of graph 100. The vertical axis 314, however, represents the percentage of maximum brightness, collectively, from all the emitters of the illumination source when all of the emitters are in an on state.

For purposes of explanation, assume that the emitters are individually controllable pixels of an SLM similar to the SLM upon which lightfield 302 is incident. In the portion of graph 300 between the $1^{st}$ pixel and the $18^{th}$ pixel, only every third pixel of the illumination source is turned on. As a result, the intensity of lightfield 302 in this portion of graph 300 is only about 33% of maximum brightness. In addition, lightfield 302 is less smooth between pixels 1-20. Between pixels 22-32, all of the emitters of the illumination source are turned on. Therefore, lightfield 302 is near 100% full brightness, and lightfield 302 is much smoother. Finally, between pixels 32-50, only every other emitter (e.g., even numbered emitters) is turned on. As a result, lightfield 302 is near 50% full brightness and has a smoothness somewhere between the previous two portions of lightfield 302.

It should be apparent in view of FIG. 3 that changes (e.g., shape, displacement, etc.) in the PSFs 304 associated with the individual emitters, will result in changes in lightfield 302. Accounting for such changes in the PSFs in relation to changes in the thermal state of a projector, facilitates a more precise modeling of lightfield 302 and, therefore, the ability to adjust image data to correct for such changes.

Figure 4:
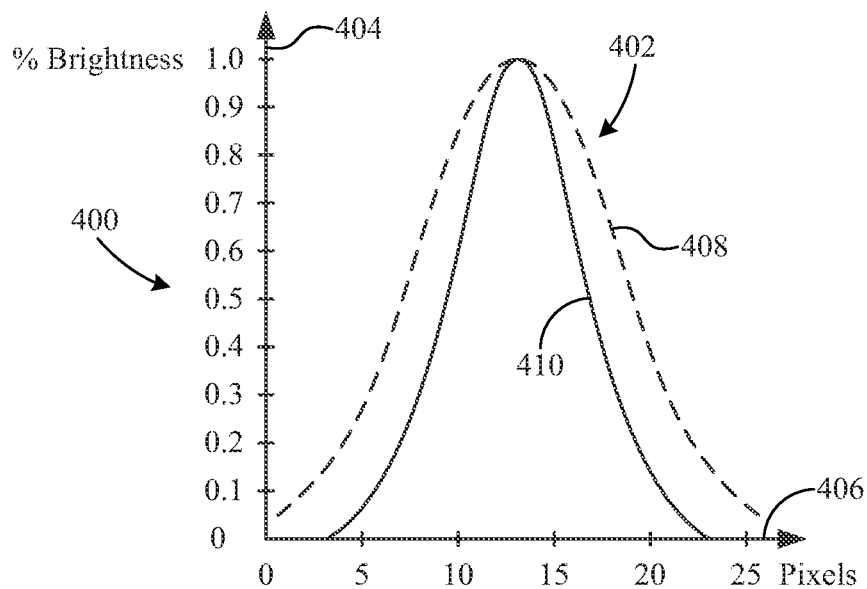
FIG. 4 is a graph showing a change in the shape of a point spread function resulting from thermal changes in a projector.

FIG. 4 is a graph 400 showing changes in the shape of a PSF 402 of an emitter resulting from thermal changes in optical components between the emitter and the lightfield. The vertical axis 404 represents the percentage of full brightness, and the horizontal axis 406 represents distance in pixels. Although shown in one dimension for simplicity of explanation, it should be understood that PSF 402 is two-dimensional, and the shape changes occur in both dimensions. Curve 408 shows the shape of PSF 402 in a first thermal state, and curve 410 shows the shape of PSF 402 in a second (e.g., warmer) thermal state. The narrowing of PSF 402 significantly affects the lightfield on the pixels of an SLM. For example, in the first thermal state light from the emitter contributes to the lightfield at pixels 1-3 and 24-26, but in the second thermal state it does not. This is only one example of a change in the lightfield due to thermal effects, which can be compensated for.

Figure 5:
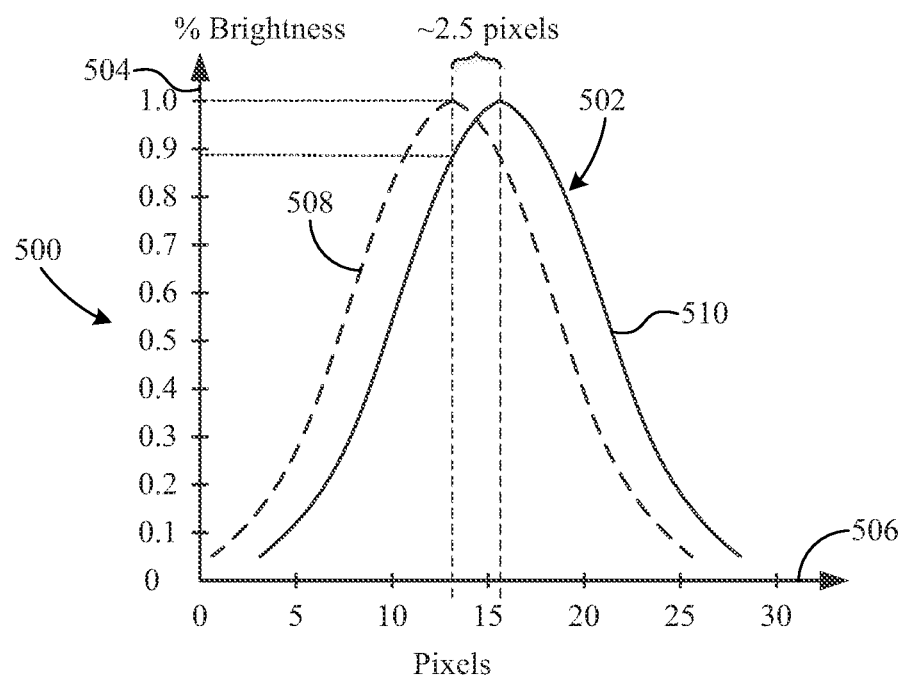
FIG. 5 is a graph showing a displacement of a point spread function resulting from thermal changes in a projector.

FIG. 5 is a graph 500 showing displacement of a PSF 502 of an emitter resulting from thermal changes in optical components between the emitter and the lightfield. The vertical axis 504 represents the percentage of full brightness, and the horizontal axis 506 represents distance in pixels. Although shown in one dimension for simplicity of explanation, it should be understood that PSF 502 is two-dimensional, and that displacements occur in both dimensions. Curve 508 shows the position of PSF 502 in a first thermal state, with peak intensity at about pixel 13. Curve 510 shows the position of PSF 402 in a second (e.g., warmer) thermal state, with peak intensity somewhere between pixel 15 and 16, about a 2.5 pixel displacement. The displacement of PSF 502 significantly affects the lightfield on the pixels of an SLM. For example, in the first thermal state the intensity of light from the emitter at about pixel 13 is 100% full brightness. However, in the second thermal state the intensity at the same position is less than 90% full brightness. This is another example of a change in the lightfield due to thermal effects, which can be compensated for.

FIG. 6 is a block diagram representing blocks of emitters associated with a lightfield generated by those emitters. Grouping the emitters into blocks facilitates the determination of a separate thermal state for each block. Modeling a separate thermal state for different groups of pixels is advantageous, because thermal gradients across optical components are not well represented by a single thermal state. In addition, changes to PSFs resulting from changes in thermal state can vary spatially across a lightfield. Dividing the pixel elements of an SLM into 32 blocks and modeling a separate thermal state for each block adequately compensates for such spatial variations and makes it more probable that PSFs of emitters of a particular block react similarly to thermal changes.

Thermal gradients across optical components can result, for example, from spatial differences in the modulation of the illumination beam. If a first area of a projected image is relatively dark for a period of time, then blocks of emitters (e.g., Blocks 0, 1, 8, and 9) corresponding to that portion of the image will transmit less optical energy along an associated optical path through PSF optics 104. If a second area of the projected image is much brighter over the same period of time, then blocks of emitters (e.g., Blocks 14, 15, 22, and 23) corresponding to that portion of the image will transmit more optical energy along a different optical path through PSF optics 104. The portions of the optical components of PSF optics 104 (e.g., one side of a lens, diffuser, reflector, etc.) exposed to the greater amount of optical energy (e.g., from Blocks 14, 15, 22, and 23) will undergo greater physical changes than the portions (e.g., the other side of the lens, diffuser, reflector, etc.) of the optical components exposed to the lesser amount of energy (e.g., from Blocks 0, 1, 8, and 9). The different thermal changes in the optical components affect the PSFs of the associated emitters differently and are more precisely compensated by using a separate thermal state for each block of emitters.

Figure 7:
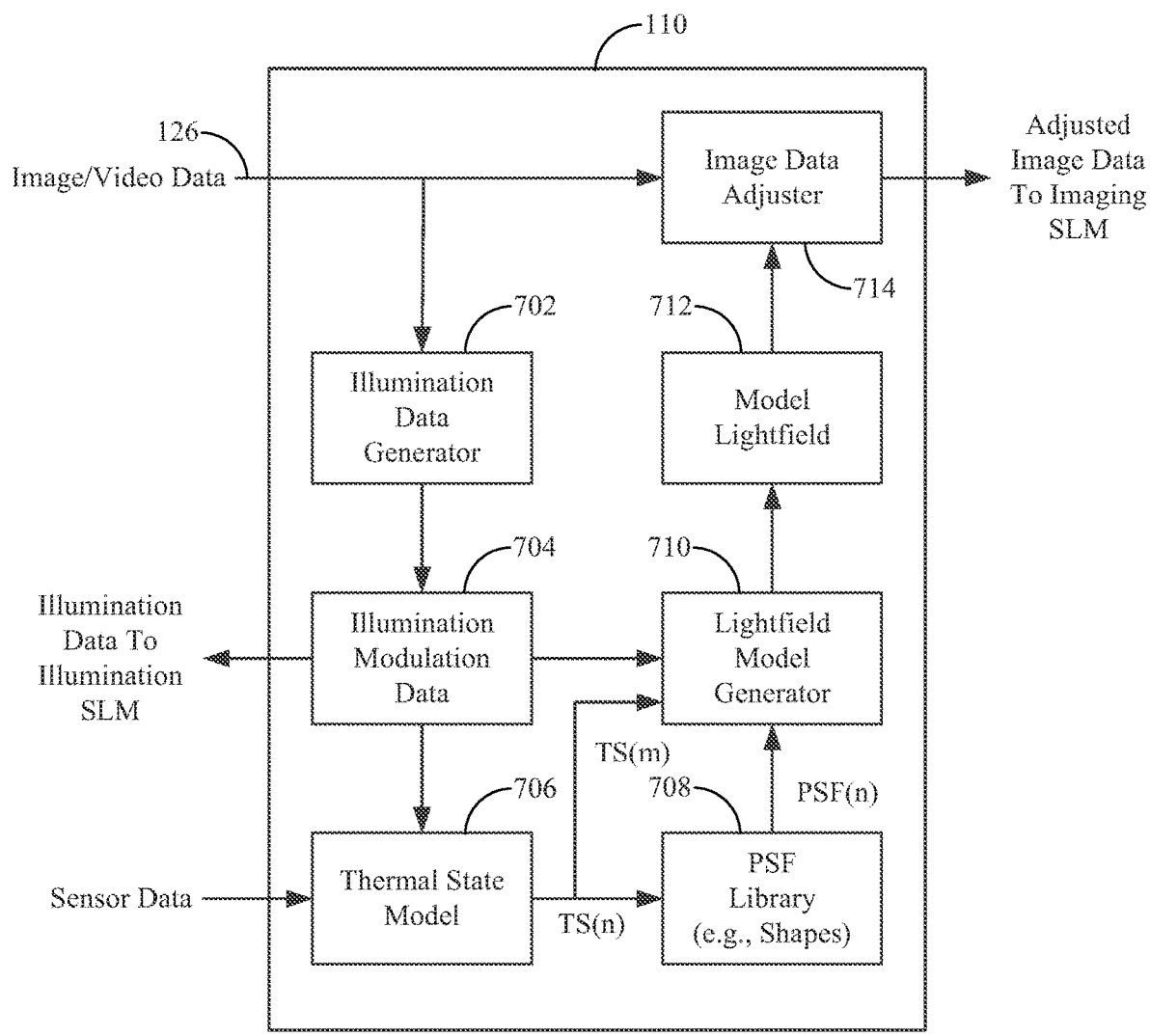
FIG. 7 is block diagram showing certain functional components of a controller of the image projector of FIG. 1.

FIG. 7 is a block diagram showing relevant functional components of controller 110. Conventional components (e.g., processing unit(s), timing circuitry, image data frame buffers, etc.) of controller 110 are omitted so as not to unnecessarily obscure the explanation of the thermal compensation aspects of the example embodiment. The following description also makes reference to components of projector 100 shown in FIG. 1.

Controller 110 includes an illumination data generator 702, illumination modulation data 704, a thermal state model 706, a PSF library 708, a lightfield model generator 710, a model lightfield 712, and an image data adjuster 714. Illumination data generator 702 is coupled to receive image data representing images to be displayed by projector 100. Illumination data generator 702 uses the image data to generate illumination modulation data 704 (e.g., half-tone image data), which is provided to illumination light modulator(s) 120 and thermal state model 706. Thermal state model 706 stores a current thermal state and updates the current thermal state based on illumination modulation data 704 and sensor data from thermal sensor set 112.

In this example embodiment, the thermal state of projector 100 includes two separate thermal states (TS(m) and TS(n)) for each block of emitters shown in FIG. 6. Using thermal states to model different PSF change phenomenon facilitates separate compensation for different types of PSF changes. For example, PSF shape changes depend significantly on location, whereas PSF displacement is relatively independent of location. In this example embodiment, thermal state TS(n) is used to determine PSF shape changes, and thermal state TS(m) is used determine PSF displacement. In addition, separate thermal states are provided for each color channel (red, green, and blue). As a result, the thermal state of projector 100 includes 192 separate values: TS(n)(0-31) and TS(m)(0-31) for each color (r, g, b).

Lightfield model generator generates model lightfield 712 as follows. PSF Library 708 is coupled to receive TS(n) from thermal state model 706, and provides a set of PSFs of particular shapes to lightfield model generator 710, depending on the value of TS(n). Lightfield model generator 710 is also coupled to receive thermal state TS(m) and illumination data 704. From the illumination modulation data, light field model generator 710 determines which emitters/pixels of illumination light modulator(s) 120 are in an on state. Then based on the current thermal state TS(n), lightfield model generator 710 retrieves a PSF(n) for each of the emitters in an on state. Next, lightfield model generator 710 applies a displacement (e.g., x, y) to each of PSF(n)s, and aggregates the displaced PSF(n)s to generate model lightfield 712. The contents of PSF library 708 and the thermal state dependent displacement functions applied by lightfield model generator 710 are determined empirically for projector 100 in a configuration process, which will be explained in greater detail below.

In this example embodiment, thermal state model 706 provides thermal state TS(n) to PSF library 708 to select PSFs of a particular shape, and provides TS(m) to lightfield model generator 710 to apply a corresponding displacement to the selected PSFs. In an alternate embodiment, lightfield model generator 710 uses TS(n) to retrieve the PSF(n)s from PSF library 708. In yet another alternate embodiment, PSF library 708 includes PSF producing algorithms that depend on both TS(n) and TS(m), and the required displacement is "built in" to the produced PSFs.

In this example embodiment, the thermal states TS(m) and TS(n) and model lightfield 712 are updated for each frame of video data. Image data adjuster 714 then adjusts the image data based on the lightfield model 712 and provides the adjusted image data to imaging SLMs 106. Image data adjuster 714 is similar to analogous components of known dual modulation systems, except that image data adjuster uses thermally compensated model lightfield 712.

Figure 8:
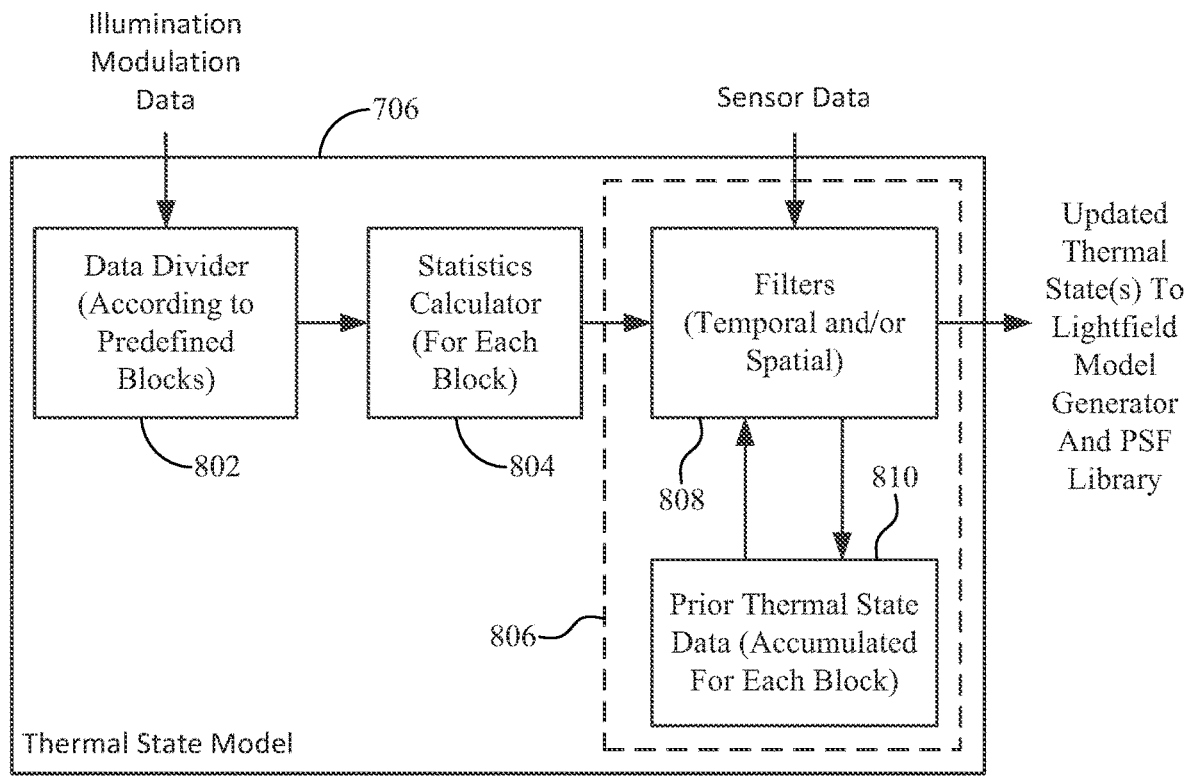
FIG. 8 is a block diagram showing an example thermal state modeling component of the controller of FIG. 7.

FIG. 8 is a block diagram showing an example embodiment of thermal state model 706 to include a data divider 802, a statistics calculator 804, and a thermal state updater 806. Thermal state updater 806 includes filters 808 (temporal and/or spatial) and prior thermal state data 810 for each block.

Thermal state model 706 operates as follows. Data divider 802 divides the illumination modulation data according to predefined blocks, as shown, for example, in FIG. 6. Statistics calculator 804 analyzes the content of the data associated with each block to generate statistics (e.g., average intensity value, luminance, etc.) for each block. Prior thermal state data 810 includes one or more prior values for each of the predefined thermal states. Filters 808 include temporal and/or spatial filters and algorithms that determine new, current thermal states based on the block statistics received from statistics calculator 804, sensor data received from sensor set 112 (FIG. 1), and the previous values of prior thermal state data 810. Filters 808 then provide the new current thermal states to PSF library 708 and lightfield model generator 710, and store the new current thermal states in prior thermal state data 810.

Figure 9:
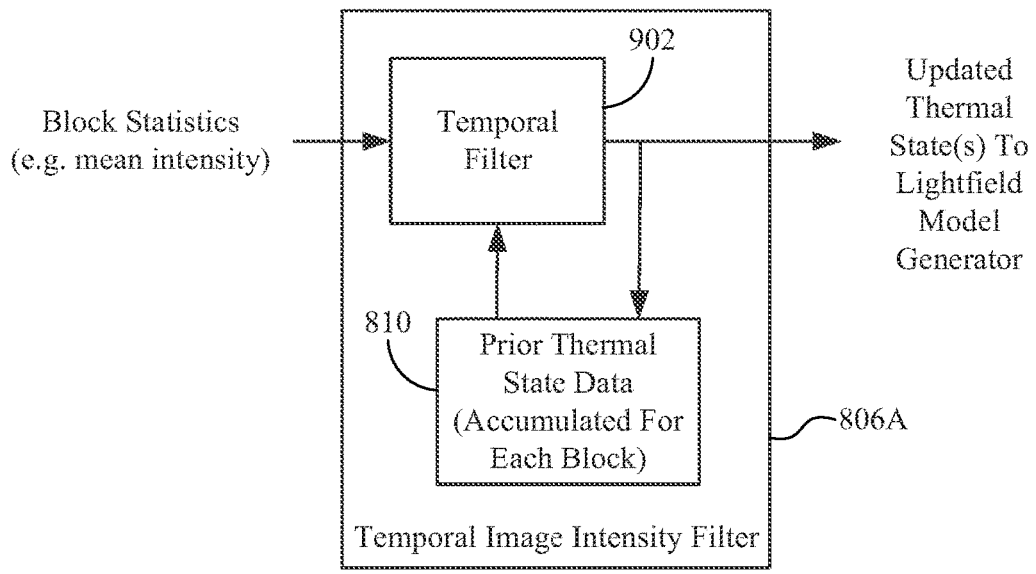
FIG. 9 is a block diagram showing an alternative thermal state modeling component of the controller of FIG. 7.

FIG. 9 is a block diagram showing an alternative thermal state updater 806A that includes a temporal filter 902. In this example embodiment, temporal filter 902 is similar to an infinite impulse response (IIR) filter, but is determined in a calibration procedure to accurately track the responses of components of projector 100. Temporal filter 902 receives block statistics from statistics calculator 804 (FIG. 8), updates prior thermal state data 810 based on the block statistics, and provides the updated thermal state data to lightfield model generator 710 (FIG. 7).

Figure 10:
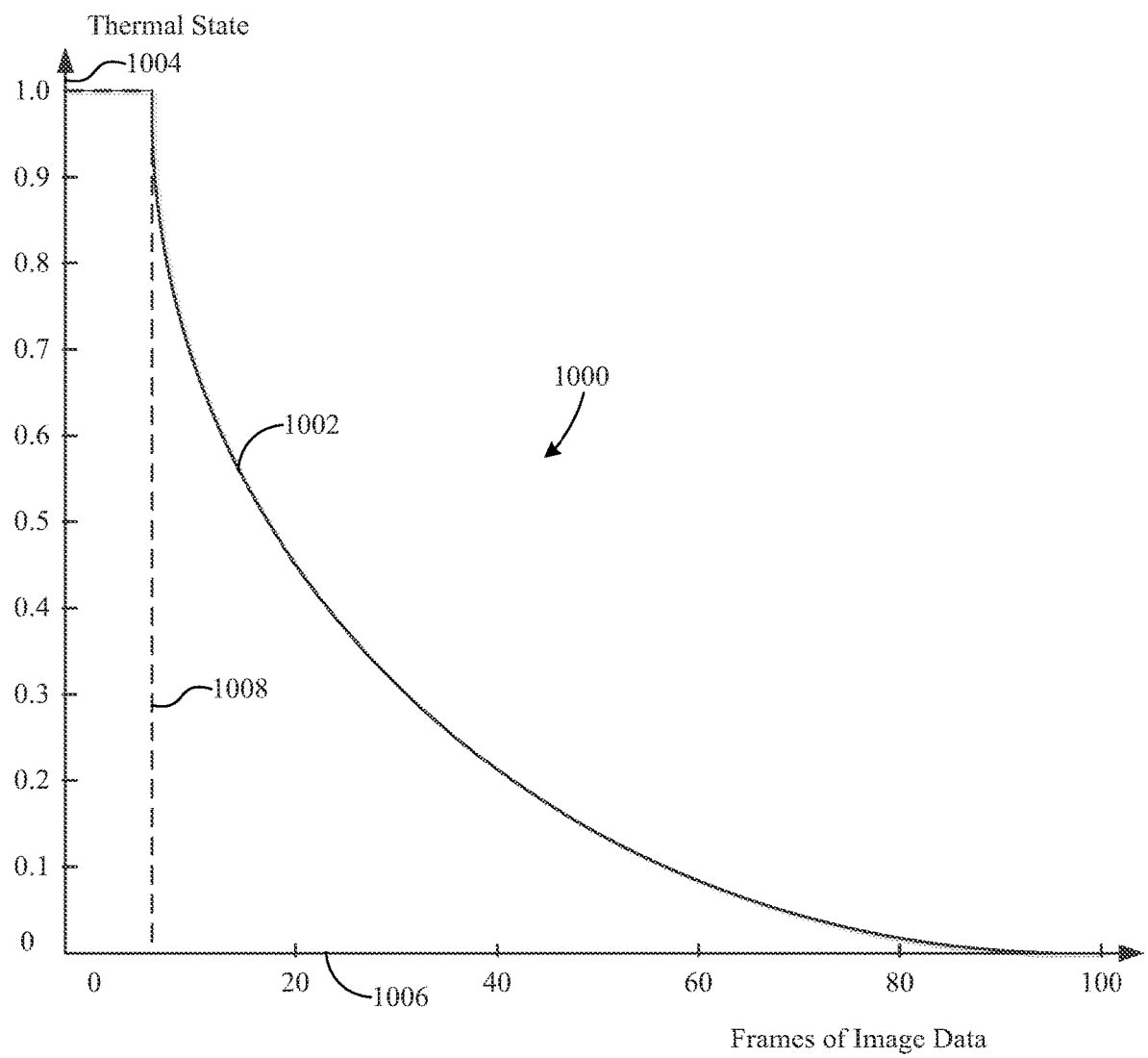
FIG. 10 is a graph showing the response of an example temporal filter employed by the thermal state modeling component of the controller of FIG. 7.

FIG. 10 is a graph 1000 showing qualitatively the response 1002 of temporal filter 902. Graph 1000 includes a vertical axis 1004 representing thermal states, and a horizontal axis 1006 representing time in units of frames of data. The dashed line 1008 indicates a steep change in input, which might occur for example when the average illumination intensity for a particular block transitions from 100% to 0%. Of course, the thermal state will not drop to zero as soon as the input changes, because components take time to cool down. In general, the response 1002 follows an "exponential" curve, responding to the steep change in input quickly at first, then slowing asymptotically as the final output value is approached.

Although curve 1002 shows a smooth continuous change in the value of the thermal state, in the example embodiment the thermal states are used as look-up arguments and, therefore, can only have discrete predefined values (e.g., 0.0, 0.1, 0.2, . . . , 1.0). As a result, temporal filter 902 rounds the output to the closest one of the predefined thermal states. In alternative embodiments, the thermal states are used computationally and, therefore, can have any value within a continuous range of values.

Figure 11:
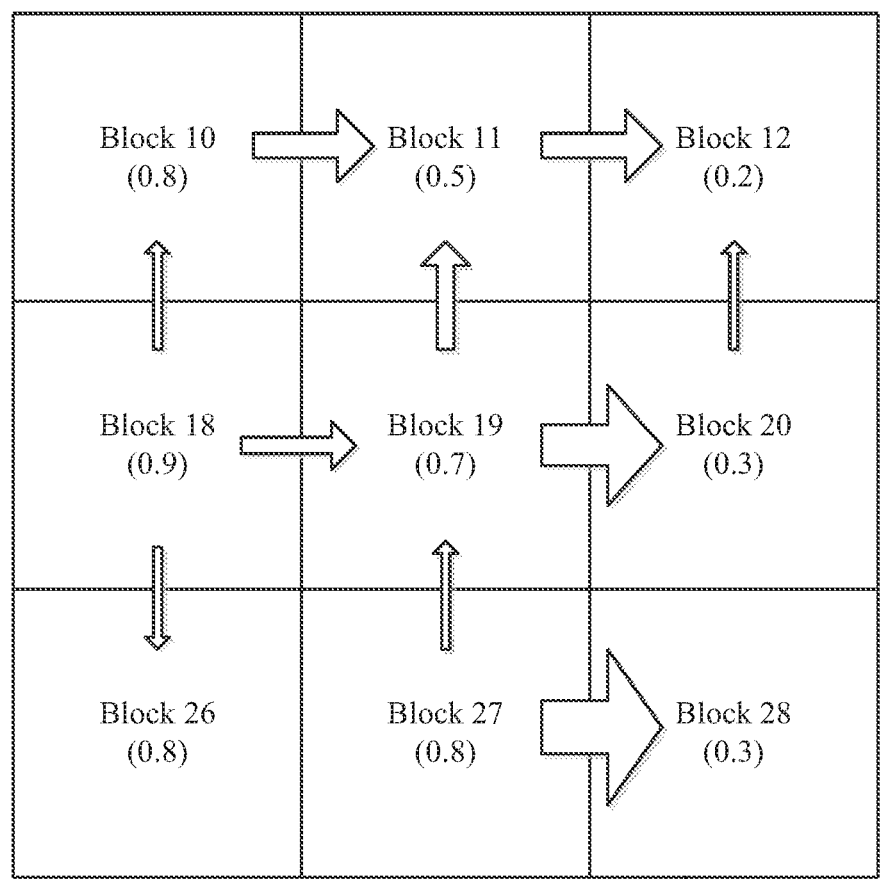
FIG. 11 is a representational diagram of thermal diffusion across an optical component.

FIG. 11 is a diagram that illustrates thermal diffusion across optical components when a spatial variation in optical energy passing through those components exists. The outer most block 1100 represents an area of an optical component. The inner blocks represent areas through which illumination from the indicated blocks of emitters pass. For example, the upper left block is primarily illuminated by the emitters of block 10. The center block is primarily illuminated by the emitters of block 19, and so on. The numbers in parenthesis represent the average intensity of illumination passing through the respective block. For example, the illumination through block 18 is 90% of maximum intensity, the illumination through block 11 is 50% of maximum intensity, and so on. The arrows represent thermal diffusion between the blocks due to temperature variation.

The widths of the arrows represent, qualitatively, the amount of thermal diffusion between adjacent blocks. For example, block 20 has an average intensity of 30%, and block 12 has an average intensity of 20%. Therefore, the temperature of block 20 should only be slightly higher than the temperature of block 12, and so thermal diffusion from block 20 to block 12 would be fairly limited. On the other hand, block 27 has an average intensity of 80%, and adjacent block 28 has an average intensity of only 30%. Therefore, the temperature of block 27 should be significantly higher than the temperature of block 28, and so thermal diffusion from block 27 to block 28 would be significant and could potentially affect the thermal states associated with blocks 27 and 28 (e.g., lower the thermal state of block 27 and raise the thermal state of block 28).

Figure 12:
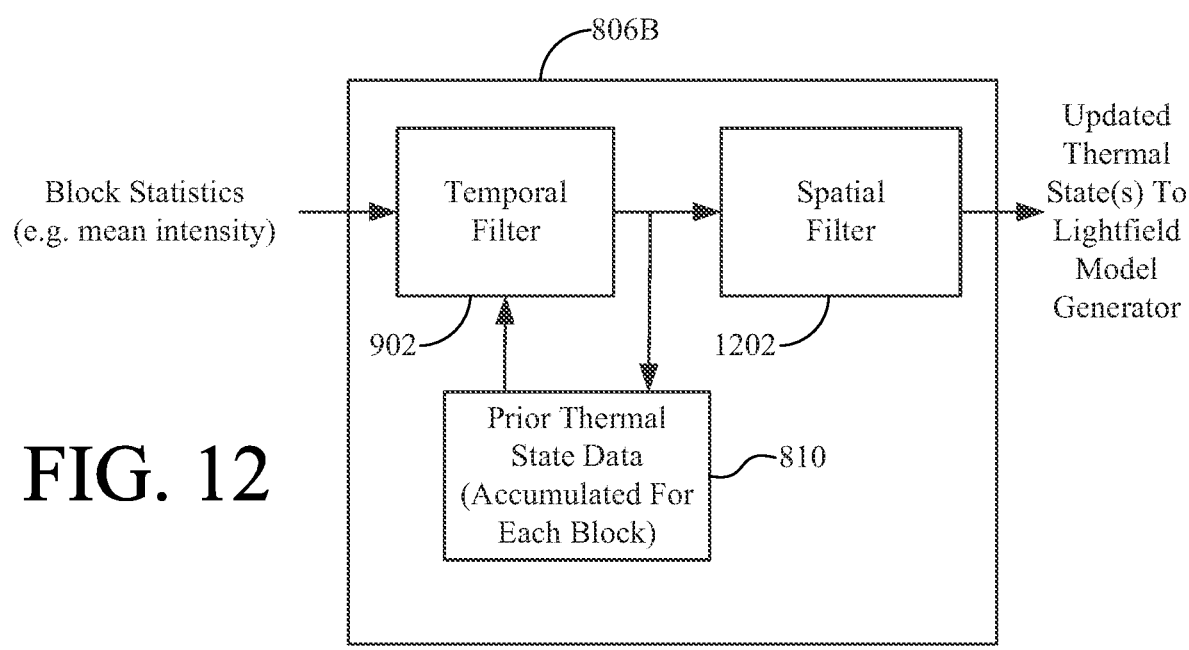
FIG. 12 is a block diagram showing an alternative thermal state modeling component including a spatial filter.

FIG. 12 is a block diagram showing an alternative thermal state updater 806B that includes temporal filter 902 and a spatial filter 1202. Spatial filter 1202 receives the updated thermal states from temporal filter 902 and modifies the updated thermal states, if necessary, due to thermal diffusion across the blocks. Spatial filter 1202 then provides the modified, updated thermal states to PSF library 708 and/or lightfield model generator 710.

Figure 13:
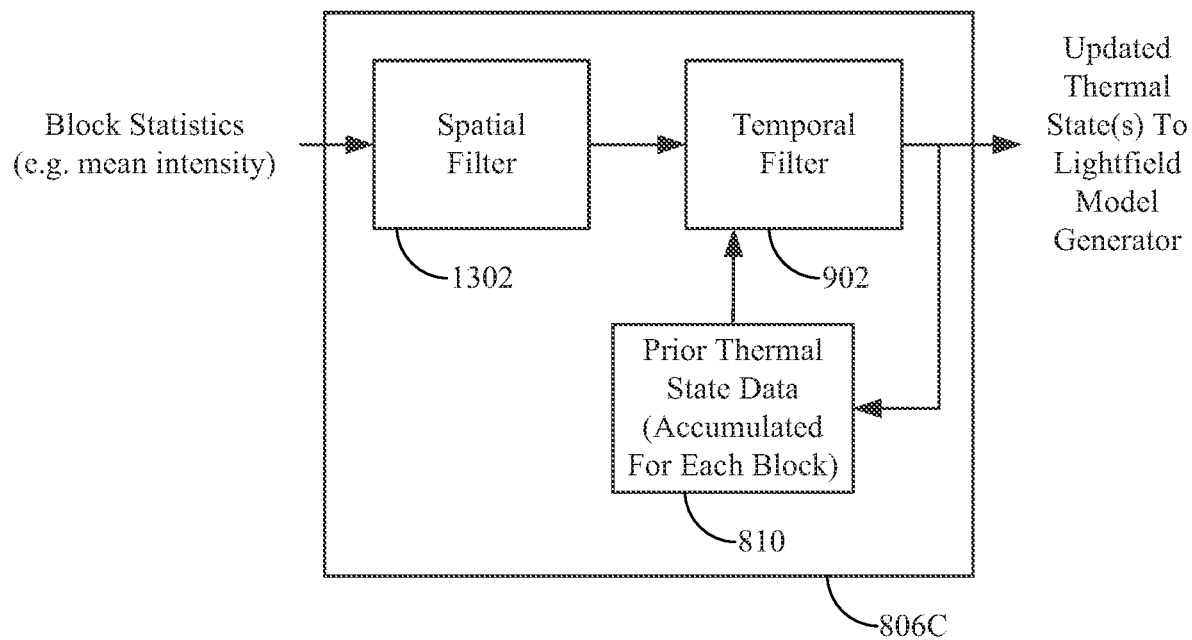
FIG. 13 is a block diagram showing another alternative thermal state modeling component including a spatial filter.

FIG. 13 is a block diagram showing another alternative thermal state updater 806C that includes temporal filter 902 and an alternate spatial filter 1302. Spatial filter 1302 receives the block statistics (e.g., mean intensities) and modifies the block statistics, if necessary, due to thermal diffusion across the blocks. Spatial filter 1202 then provides the modified, block statistics to temporal filter 902, which uses the modified block statistics to update the thermal states of the blocks as previously described. Temporal filter 902 then stores the updated thermal states in prior thermal state data 810 and provides the updated thermal states to PSF library 708 and/or lightfield model generator 710.

Figure 14:
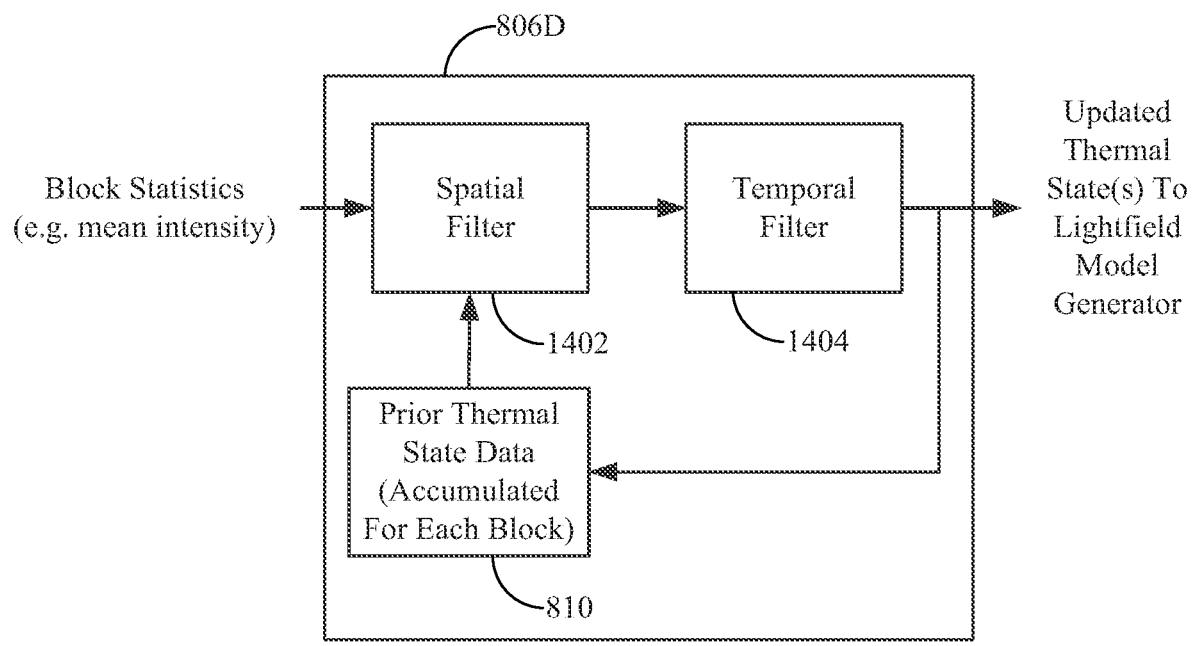
FIG. 14 is a block diagram showing yet another alternative thermal state modeling component including a spatial filter.

FIG. 14 is a block diagram showing yet another alternative thermal state updater 806D that includes an alternative spatial filter 1402 and an alternative temporal filter 1404. Spatial filter 1402 receives the block statistics (e.g., mean intensities) and the prior thermal state data 810, updates the block statistics and/or the prior thermal states, if necessary, due to thermal diffusion across the blocks, and provides the updated block statistics and/or thermal states to temporal filter 1404. Temporal filter 1404 further updates the thermal state, stores the updated thermal states in prior thermal state data 810, and provides the updated thermal states to PSF library 708 and/or lightfield model generator 710.

Thermal sensor data and illumination modulation data based models can be combined to provide additional advantages. For example, the illumination data based models can provide an instantaneous response to input changes and provide spatial discrimination across components. In addition, thermal sensor data can provide information related to ambient conditions and other slowly changing components that cannot be determined from the image data and/or the illumination data.

Figure 15:
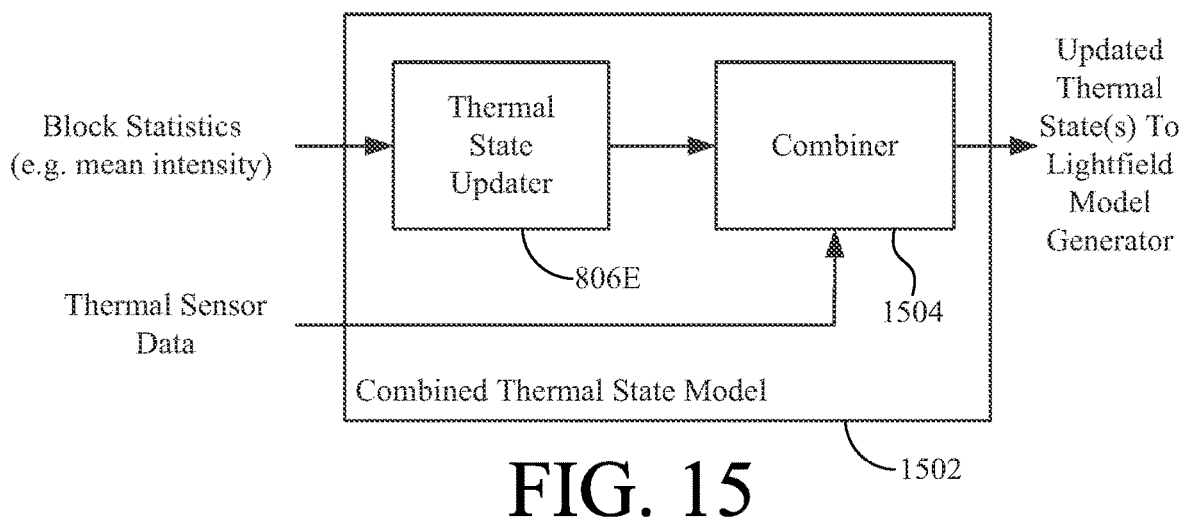
FIG. 15 is a block diagram showing a combined thermal state modeling component configured to receive data from thermal sensors.

FIG. 15 is a block diagram showing a combined thermal state model 1502 to include an alternate thermal state updater 806E and a combiner 1504. Thermal state updater 806E is similar in function to previously described thermal state updaters 806A-D, updating the thermal states of projector 100 based on illumination modulation data. However, thermal state updater 806E then provides the updated thermal states to combiner 1504. Combiner 1504 then further updates the thermal states based on thermal sensor data received from thermal sensor set 112. For example, combiner 1502 can determine one thermal state based on the sensor data, and then combine that thermal state with a thermal state provided by thermal state updater 806E to obtain a single thermal state that is based on both illumination modulation data and thermal sensor data.

Figure 16:
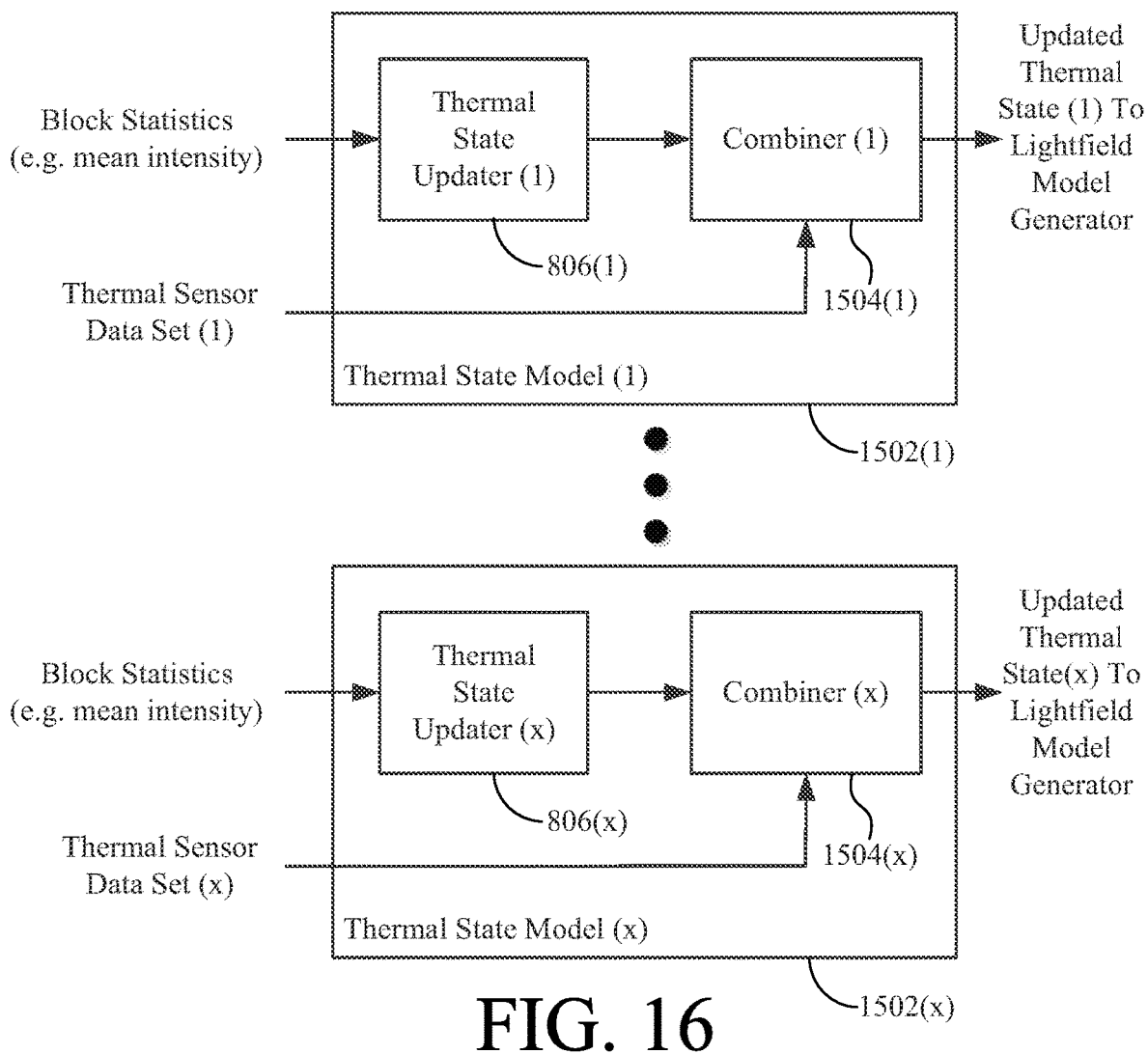
FIG. 16 is a block diagram showing a thermal state model that generates multiple thermal states in parallel.

FIG. 16 is a block diagram of a thermal state model that combines multiple parallel models 1502(1-x). Each model 1502(1-x) corresponds to a different component or groups of components, and each thermal state updater 806(1-x) and combiner 1504(1-x) includes unique temporal and spatial filtering characteristics, specifically configured for the particular components being modeled. Each model 1502(1-x), therefore, generates a unique thermal state value corresponding to the modeled component.

Although models 1502(1) and 1502(x) appear similar in structure, they need not be so. For example some of parallel models 1502 might not receive or depend on thermal sensor data. Others of parallel models 1502 might not receive or depend on illumination modulation data.

Figure 17:
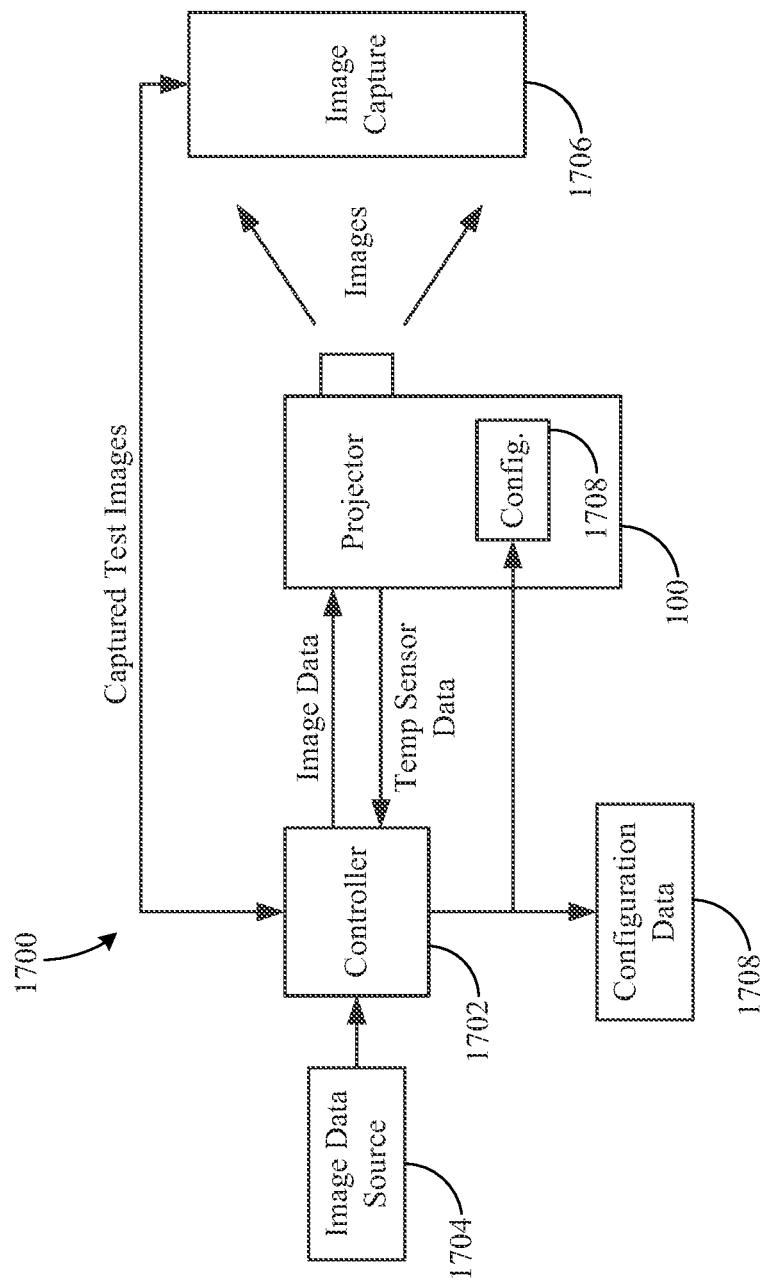
FIG. 17 is a block diagram of a system for configuring a projector for thermal compensation.

FIG. 17 is a block diagram of a configuration system 1700 for configuring projector 100 for thermal compensation. Configuration system 1700 includes a controller 1702, an image data source 1704, and an image capture device 1706. Configuration system 1700 generates configuration data 1708, which is installed in projector 100. Examples of configuration data 1708 in the previously described example embodiment include PSF library 708 and portions of lightfield model generator 710 (FIG. 7).

Controller 1702 includes a processing unit and memory for storing data and code (not shown) that, when executed by the processing unit imparts the following functionality to controller 1702.

Configuration system 1700 generates configuration data 1708 as follows. First, controller 1702 provides first predetermined image data to projector 100. Projector 100 displays the first predetermined image (e.g., all black screen) for a time sufficient to ensure that projector 100 has stabilized in a first (e.g., coolest) thermal state. Then, while projector is in the first thermal state, controller 1702 provides test image data to projector 100. Projector 100 projects the test image onto image capture device 1706, which captures an image of the test image and transfers the captured test image to controller 1702. Controller 1702 analyzes the captured test image to determine the PSFs generated by the emitters (e.g., illumination light modulator(s) 120) of projector 100. Then, controller 1702 stores data associating the determined PSFs with the first thermal state in configuration data 1708.

Next, controller 1702 provides second predetermined image data to projector 100. Projector 100 displays the second predetermined image (e.g., flat 10% grayscale image) for a time sufficient to ensure that projector 100 has stabilized in a second (e.g., TS=0.1) thermal state. Then, while projector 100 is in the second thermal state, controller 1702 provides test image data to projector 100. Projector 100 projects the test image onto image capture device 1706, which captures an image of the test image and transfers the captured test image to controller 1702. Controller 1702 analyzes the captured test image to determine the PSFs generated by the emitters (e.g., illumination light modulator(s) 120) of projector 100. Then, controller 1702 stores data associating the determined PSFs with the second thermal state in configuration data 1708. In addition, controller 1702 determines displacements of the PSFs of the second thermal state with respect to the PSFs of the first thermal state and stores data associating the displacements with the second thermal state.

Controller 1702 continues the foregoing process, stabilizing projector 100 in each thermal state (0.2, 0.3, . . . , 1.0), capturing and analyzing test data, and storing configuration data associating PSFs and displacements with each of the thermal states. Once the configuration process is complete, controller 1702 copies configuration data 1708 into projector 100.

Figure 18:
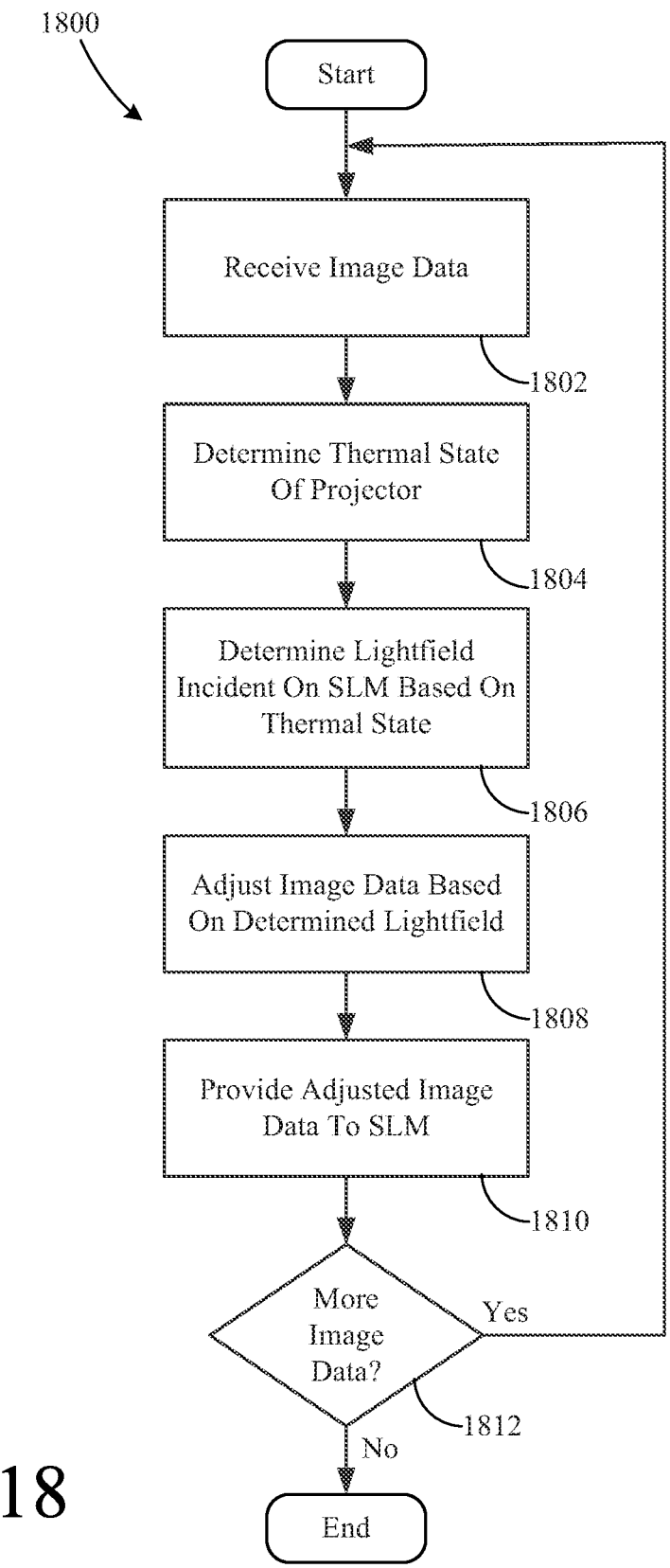
FIG. 18 is a flowchart summarizing an example method of driving a spatial light modulator in a projector.

FIG. 18 is a flowchart summarizing an example method 1800 of driving a spatial light modulator in a projector with thermal compensation capabilities. In a first step 1802, image data is received. Then, in a second step 1804, a thermal state of the projector is determined. Next, in a third step 1806, a lightfield incident on an SLM is determined based at least in part on the thermal state. Then, in a fourth step 1808, the image data is adjusted based on the determined lightfield and, in a fifth step 1810, the adjusted image data is provided to the SLM. In a sixth step 1812, it is determined whether there is any more image data to display. If not, then method 1800 ends. Otherwise, method 1800 returns to first step 1802.

Figure 19:
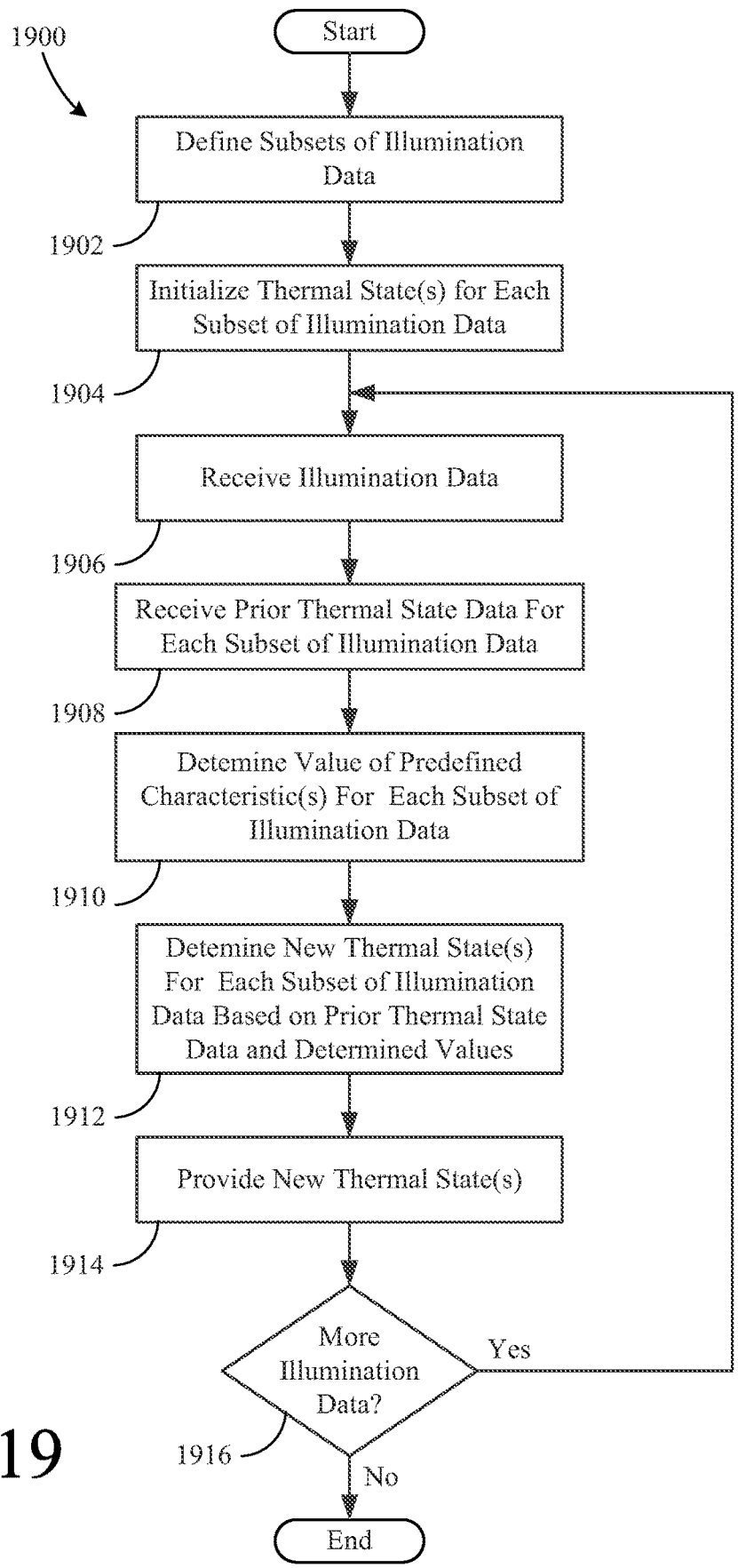
FIG. 19 is a flowchart summarizing an example method of performing the "Determine Thermal State of Projector" step of the method of FIG. 18.

FIG. 19 is a flowchart summarizing an example method 1900 of performing the "Determine Thermal State of Projector" step 1804 of method 1800. In a first step 1902, subsets of illumination data are defined. Then, in a second step 1904, thermal states are initialized for each subset of illumination data. Next, in a third step 1906, illumination data is received. Then, in a fourth step 1908, prior thermal state data is received for each subset of illumination data. Then, in a fifth step 1910, a value of a predefined characteristic is determined for each subset of illumination data. Next, in a sixth step 1912, a new thermal state is determined for each subset of illumination data based on the prior thermal state data and the determined values. Then, in a seventh step 1914, the new thermal states are provided. In an eighth step 1916, it is determined whether more illumination data is available. If so, method 1900 returns to third step 1906. Otherwise, method 1900 ends.

Figure 20:
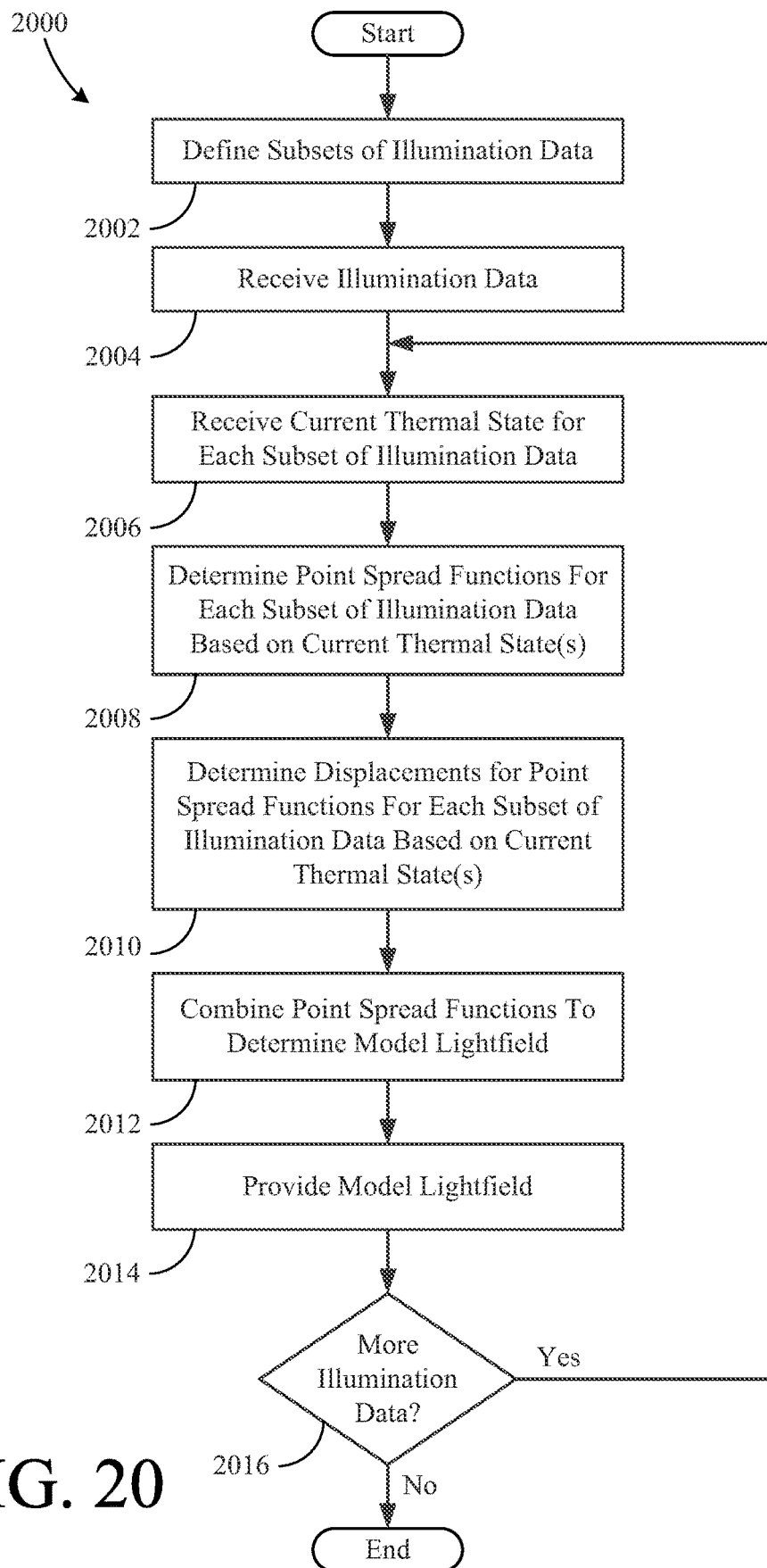
FIG. 20 is a flowchart summarizing an example method of performing the "Determine Lightfield Incident on SLM Based on Thermal State" step of the method of FIG. 18.

FIG. 20 is a flowchart summarizing an example method of performing the "Determine Lightfield Incident on SLM Based on Thermal State" step 1806 of method 1800. In a first step 2002, subsets of illumination data are defined. Then, in a second step 2004, illumination data is received. Next, in a third step 2006, a current thermal state is received for each subset of illumination data. Then, in a fourth step 2008, point spread functions (PSFs) are determined for each subset of illumination data based on the current thermal states. Next, in a fifth step 2010, PSF displacements are determined for each subset of the illumination data based on the current thermal states. Then, in a sixth step 2012, the PSFs are combined to determine a model lightfield and, in a seventh step 2014, the model lightfield is provided. In an eighth step 2016, it is determined whether more illumination data is available. If so, then method 2000 returns to third step 2006. If not, then method 2000 ends.

Figure 21:
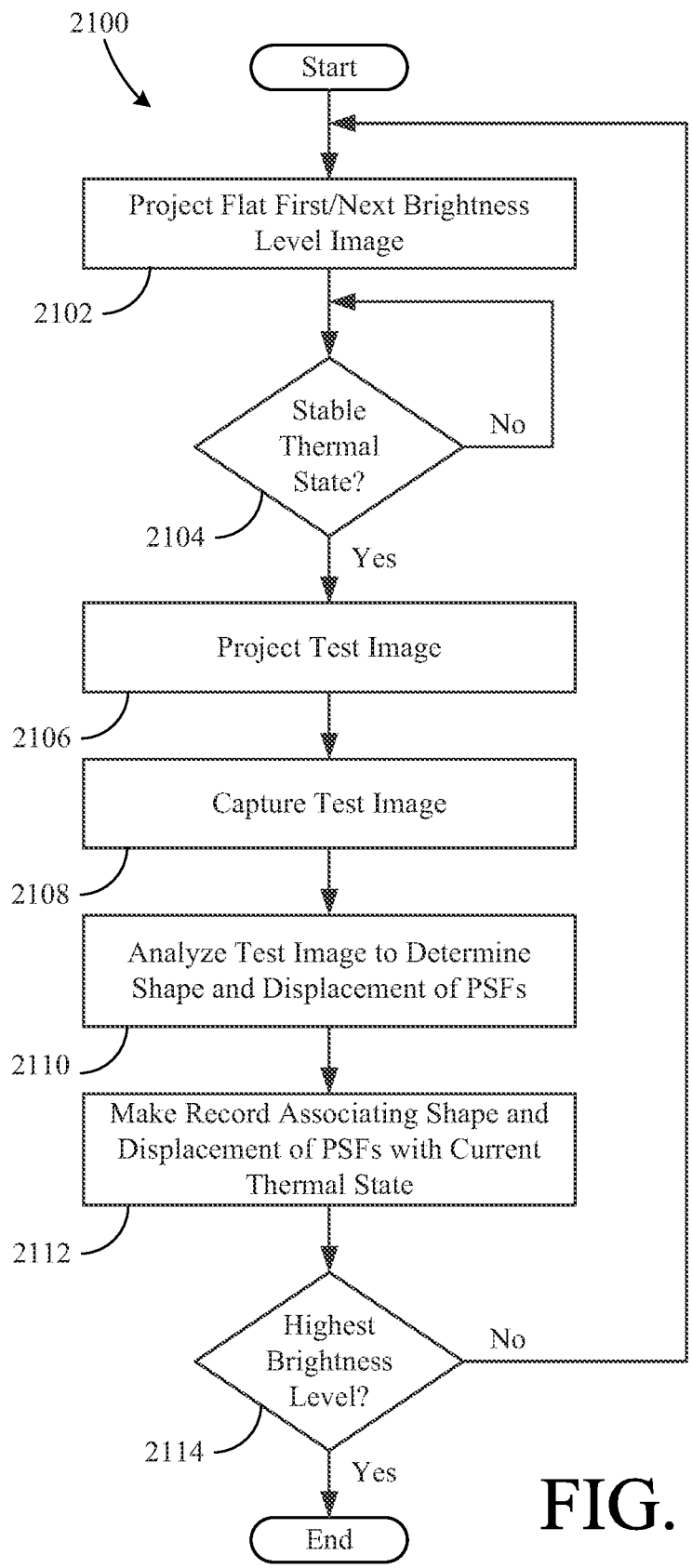
FIG. 21 is a flowchart summarizing an example method of configuring a projector for thermal compensation.

FIG. 21 is a flowchart summarizing an example method 2100 of configuring a projector for thermal compensation. In a first step 2102, a first predetermined image of a particular brightness level is projected. Then, in a second step 2104, it is determined whether the projector is in a stable thermal state. If not, second step 2104 repeats until the projector is in a stable thermal state and then proceeds to a third step 2106 where a test image is projected. Then, in a fourth step 2108, the test image is captured. Next, in a fifth step 2110, the test image is analyzed to determine the shape and displacement of PSFs. Then, in a sixth step 2112, a record associating the shape and displacement of PSFs with the current thermal state is made. Next, in a seventh step 2114, it is determined whether the current thermal state corresponds to the last (e.g., highest) brightness level of the projector. If so, method 2100 ends. Otherwise, method 2100 returns to first step 2102 where the next predetermined image of the next particular brightness level is projected, and method 2100 continues.

The description of particular embodiments of the present invention is now complete. Many of the described features may be substituted, altered or omitted without departing from the scope of the invention. For example, alternate types of SLMs (e.g., LCOS, MEMS, etc.), may be substituted for the DMDs. As another example, different types of controllable light sources (e.g., LED arrays) can be substituted for the DMD illumination light modulator. These and other deviations from the particular embodiments shown will be apparent to those skilled in the art, particularly in view of the foregoing disclosure.

Enumerated Example Embodiments

Thus, embodiments of the present invention may relate to one or more of the enumerated example embodiments below, each of which are examples, and, as with any other related discussion provided above, should not be construed as limiting any or claims provided yet further below as they stand now or as later amended, replaced, or added. Likewise, these examples should not be considered as limiting with respect to any claim or claims of any related patents and/or patent applications (including any foreign or international counterpart applications and/or patents, divisionals, continuations, re-issues, etc.).

Enumerated example embodiment 1 is an image projector comprising: an image data input for receiving image data; a controller coupled to receive said image data and operative to determine a thermal state of said image projector and to adjust said image data depending on said thermal state of said image projector to generate thermally adjusted image data; a light source operative to emit an illumination beam; illumination optics disposed in the path of said illumination beam and operative to convert said illumination beam into a lightfield; an imaging spatial light modulator coupled to receive said thermally adjusted image data from said controller, disposed to receive said lightfield, and operative to modulate said lightfield responsive to said thermally adjusted image data to generate an imaging beam; and imaging optics disposed in the path of said imaging beam and operative to focus said imaging beam on a viewing surface.

Enumerated example embodiment 2 is a method as described in the image projector of enumerated example embodiment 1, wherein said light source includes a plurality of individual emitters.

Enumerated example embodiment 3 is a method as described in the image projector of enumerated example embodiment 2, wherein said individual emitters are separately controllable.

Enumerated example embodiment 4 is a method as described in the image projector of enumerated example embodiment 3, wherein said individual emitters are pixels of an illumination spatial light modulator (SLM) coupled to receive illumination data from said controller and operative to modulate said illumination beam depending on said illumination data.

Enumerated example embodiment 5 is a method as described in the image projector of Enumerated example embodiment 4, wherein said controller is operative to:

generate said illumination data from said image data; provide said illumination data to said illumination SLM; update said thermal state of said image projector based at least in part on said illumination data; and adjust said image data depending on said updated thermal state of said image projector to generate said thermally adjusted image data.

Enumerated example embodiment 6 is a method as described in the image projector of Enumerated example embodiment 1, further comprising: a set of thermal sensors coupled to provide temperature data to said controller; and wherein said thermal state of said image projector is determined by said controller based at least in part on said temperature data.

Enumerated example embodiment 7 is a method as described in the image projector of Enumerated example embodiment 6, further comprising: an air intake for drawing air into said image projector to cool said image projector; and wherein at least one of said thermal sensors is disposed to sense the temperature of said air drawn into said image projector.

Enumerated example embodiment 8 is a method as described in the image projector of enumerated example embodiment 6, wherein at least one of said thermal sensors is disposed to sense the temperature within said light source.

Enumerated example embodiment 9 is a method as described in the image projector of enumerated example embodiment 6, wherein at least one of said thermal sensors is coupled to an optics mount of said illumination optics.

Enumerated example embodiment 10 is a method as described in The image projector of enumerated example embodiment 6, wherein said thermal state of said image projector is determined by said controller based at least in part on content of said image data.

Enumerated example embodiment 11 is a method as described in the image projector of enumerated example embodiment 1, wherein said thermal state of said image projector is determined by said controller based at least in part on content of said image data.

Enumerated example embodiment 12 is a method as described in the image projector of enumerated example embodiment 1, wherein said thermal state of said image projector is determined by said controller based at least in part on a prior thermal state of said image projector.

Enumerated example embodiment 13 is a method as described in the image projector of enumerated example embodiment 12, wherein said thermal state of said image projector is determined by said controller based at least in part on content of said image data.

Enumerated example embodiment 14 is a method as described in the image projector of enumerated example embodiment 13, wherein said thermal state of said image projector is determined by said controller based at least in part on input from temperature sensors.

Enumerated example embodiment 15 is a method as described in the image projector of enumerated example embodiment 13, wherein said controller employs a temporal filter to determine the thermal state of said image projector.

Enumerated example embodiment 16 is a method as described in the image projector of enumerated example embodiment 13, wherein said thermal state of said image projector is determined by said controller based at least in part on an average of intensity values of said image data.

Enumerated example embodiment 17 is a method as described in the image projector of enumerated example embodiment 1, wherein:

said light source includes a plurality of emitters;
said emitters are divided into groups, each group being associated with a corresponding portion of said lightfield; and
said thermal state of said image projector includes a separate thermal state for each group of said emitters.

Enumerated example embodiment 18 is a method as described in the image projector of enumerated example embodiment 17, wherein said thermal state of said image projector includes a plurality of thermal states for each group of said emitters.

Enumerated example embodiment 19 is a method as described in the image projector of enumerated example embodiment 17, wherein said emitters are pixels of a spatial light modulator.

Enumerated example embodiment 20 is a method as described in the image projector of enumerated example embodiment 17, wherein said controller is operative to determine said separate thermal state for each group of emitters based at least in part on said separate thermal states of adjacent groups of said emitters.

Enumerated example embodiment 21 is a method as described in the image projector of enumerated example embodiment 1, wherein said controller is configured to adjust said image data depending on said thermal state of said projector by: creating a model of said lightfield based at least in part on said thermal state of said image projector; and adjusting said image data based on said model of said lightfield.

Enumerated example embodiment 22 is a method as described in the image projector of enumerated example embodiment 21, wherein said light source includes a plurality of individual emitters, and said controller is configured to: select a point spread function associated with each of said individual emitters based on said thermal state of said projector; and convolve said selected point spread functions to create said model of said lightfield.

Enumerated example embodiment 23 is a method as described in the image projector of enumerated example embodiment 22, wherein shapes of said point spread functions vary depending on said thermal state of said image projector.

Enumerated example embodiment 24 is a method as described in the image projector of enumerated example embodiment 23, wherein positions of said point spread functions vary depending on said thermal state of said image projector.

Enumerated example embodiment 25 is a method as described in the image projector of enumerated example embodiment 22, wherein positions of said point spread functions vary depending on said thermal state of said image projector.

Enumerated example embodiment 26 is a method as described in the image projector of enumerated example embodiment 22, wherein creating said model of said lightfield based at least in part on said thermal state of said image projector includes creating a different color specific model of said lightfield for each of a plurality of different colors depending on said thermal state of said projector.

Enumerated example embodiment 27 is a method as described in the image projector of enumerated example embodiment 26, wherein said controller is configured to select said point spread functions based at least in part on said different colors.

Enumerated example embodiment 28 is a method as described in the image projector of enumerated example embodiment 22, wherein: said emitters are divided into groups, each group being associated with a corresponding portion of said lightfield; and said thermal state of said image projector includes a separate thermal state for each group of said emitters.

Enumerated example embodiment 29 is a method as described in the image projector of enumerated example embodiment 28, wherein said point spread functions are selected based on which particular group a corresponding emitter is a member of and also based on said separate thermal state associated with said particular group.

Enumerated example embodiment 30 is a method as described in the image projector of enumerated example embodiment 28, wherein: said thermal state of said image projector includes at least two separate thermal states for each group of said emitters; said controller selects a point spread function of a particular shape depending on a first of said thermal states associated with an emitter's group; and said controller determines a displacement of said selected point spread function depending on a second of said thermal states associated with said emitter's group.

Enumerated example embodiment 31 The image projector of enumerated example embodiment 22, wherein: said plurality of emitters include pixels of an illumination SLM; and said point spread functions are selected based at least in part on illumination data provided to said illumination SLM by said controller.

Enumerated example embodiment 32 is a method as described in the image projector of enumerated example embodiment 1, wherein said thermal state of said projector is updated responsive to every frame of said image data.

Enumerated example embodiment 33 is a method as described in The image projector of enumerated example embodiment 1, further comprising: a plurality of predefined thermal states spanning the operating temperature range of said projector; and wherein said controller is configured to determine said thermal states of said image projector by selecting ones of said predefined thermal states.

Enumerated example embodiment 34 is a method as described in a method of driving a spatial light modulator in a projector, said method comprising: receiving image data to be displayed by said spatial light modulator (SLM); determining a thermal state of said projector; adjusting said image data based on said thermal state of said projector to generate thermally adjusted image data; and providing said thermally adjusted image data to said SLM.

Enumerated example embodiment 35 is a method as described in is a method as described in the method of enumerated example embodiment 34, further comprising: generating illumination data based on said image data; and providing said illumination data to a light source configured to illuminate said SLM based on said illumination data.

Enumerated example embodiment 36 is a method as described in the method of enumerated example embodiment 35, further comprising: updating said thermal state of said projector based on said illumination data to generate an updated thermal state of said projector; and adjusting subsequent image data based on said updated thermal state of said projector.

Enumerated example embodiment 37 is a method as described in the method of enumerated example embodiment 34, further comprising: receiving temperature data from a thermal sensor set; and wherein determining said thermal state of said projector includes determining said thermal state of said projector based at least in part on said temperature data.

Enumerated example embodiment 38 is a method as described in the method of enumerated example embodiment 37, wherein receiving said temperature data from said thermal sensor set includes receiving temperature data indicative of the temperature of ambient air flowing into said projector.

Enumerated example embodiment 39 is a method as described in the method of enumerated example embodiment 37, wherein receiving said temperature data from said thermal sensor set includes receiving temperature data indicative of the temperature of a component of a light source configured to illuminate said SLM.

Enumerated example embodiment 40 is a method as described in the method of enumerated example embodiment 37, wherein receiving said temperature data from said thermal sensor set includes receiving temperature data indicative of the temperature of optics disposed between said SLM and a light source configured to illuminate said SLM.

Enumerated example embodiment 41 is a method as described in the method of enumerated example embodiment 37, wherein determining said thermal state of said projector includes determining said thermal state of said projector based at least in part on content of said image data.

Enumerated example embodiment 42 is a method as described in the method of enumerated example embodiment 34, wherein determining said thermal state of said projector includes determining said thermal state of said projector based at least in part on content of said image data.

Enumerated example embodiment 43 is a method as described in the method of enumerated example embodiment 34, wherein determining said thermal state of said projector includes determining said thermal state of said projector based at least in part on a prior thermal state of said image projector.

Enumerated example embodiment 44 is a method as described in the method of enumerated example embodiment 43, wherein determining said thermal state of said projector includes determining said thermal state of said projector based at least in part on content of said image data.

Enumerated example embodiment 45 is a method as described in the method of enumerated example embodiment 44, wherein determining said thermal state of said projector further includes: receiving temperature data from a thermal sensor set; and wherein determining said thermal state of said projector includes determining said thermal state of said projector based at least in part on said temperature data.

Enumerated example embodiment 46 is a method as described in the method of enumerated example embodiment 44, wherein determining said thermal state of said projector further includes temporal filtering.

Enumerated example embodiment 47 is a method as described in the method of enumerated example embodiment 43, wherein determining said thermal state of said projector includes determining said thermal state of said projector based at least in part on average intensity values of said image data.

Enumerated example embodiment 48 is a method as described in the method of enumerated example embodiment 34, wherein determining said thermal state of said projector includes: defining groups of individual emitters illuminating said SLM; and determining a separate thermal state for each of said groups of individual emitters.

Enumerated example embodiment 49 is a method as described in the method of enumerated example embodiment 48, wherein determining said thermal state of said projector includes determining a plurality of separate thermal states for each of said groups of individual emitters.

Enumerated example embodiment 50 is a method as described in the method of enumerated example embodiment 48, wherein defining groups of individual emitters illuminating said SLM includes defining blocks of pixels of an illuminating spatial light modulator.

Enumerated example embodiment 51 is a method as described in the method of enumerated example embodiment 48, wherein determining said separate thermal state for each of said groups of individual emitters includes determining said separate thermal state for each of said groups of individual emitters based at least in part on said separate thermal states of adjacent groups of said emitters.

Enumerated example embodiment 52 is a method as described in the method of enumerated example embodiment 34, wherein adjusting said image data based on said thermal state of said projector includes: determining characteristics of an illuminating lightfield incident on said SLM based at least in part on said thermal state of said projector; and adjusting said image data based on said characteristics of said illuminating lightfield.

Enumerated example embodiment 53 is a method as described in the method of enumerated example embodiment 52, wherein determining characteristics of said illuminating lightfield includes: selecting a point spread function associated with each of a plurality of emitters illuminating said SLM based on said thermal state of said projector; and convolving said selected point spread functions to create a model of said illuminating lightfield.

Enumerated example embodiment 54 is a method as described in the method of enumerated example embodiment 53, wherein shapes of said point spread functions vary depending on said thermal state of said projector.

Enumerated example embodiment 55 is a method as described in the method of enumerated example embodiment 54, wherein positions of said point spread functions vary depending on said thermal state of said image projector.

Enumerated example embodiment 56 is a method as described in the method of enumerated example embodiment 53, wherein positions of said point spread functions vary depending on said thermal state of said image projector.

Enumerated example embodiment 57 is a method as described in the method of enumerated example embodiment 53, wherein determining characteristics of said illuminating lightfield includes creating a different color specific model of said lightfield for each of a plurality of different colors depending on said thermal state of said projector.

Enumerated example embodiment 58 is a method as described in the method of enumerated example embodiment 57, wherein selecting said point spread functions includes selecting said point spread functions based at least in part on said different colors.

Enumerated example embodiment 59 is a method as described in the method of enumerated example embodiment 53, wherein:
selecting a point spread function associated with each of said plurality of emitters includes defining groups of said emitters, each group being associated with a corresponding portion of said illuminating lightfield; and
determining a thermal state of said projector includes determining a separate thermal state for each group of said emitters.

Enumerated example embodiment 60 is a method as described in the method of enumerated example embodiment 59, wherein selecting said point spread functions includes selecting said point spread functions depending on which particular group a corresponding emitter is a member of and also depending on said separate thermal state associated with said particular group.

Enumerated example embodiment 61 is a method as described in the method of enumerated example embodiment 59, wherein: determining said thermal state of said projector includes determining at least two separate thermal states for each group of emitters; and determining characteristics of said illuminating lightfield includes selecting a point spread function of a particular shape depending on a first of said thermal states associated with an emitter's group and determining a displacement of said selected point spread function depending on a second of said thermal states associated with said emitter's group.

Enumerated example embodiment 62 is a method as described in the method of enumerated example embodiment 53, wherein: said plurality of emitters include pixels of an illumination SLM; and selecting said point spread functions includes selecting said point spread functions depending at least in part on illumination data provided to said illumination SLM.

Enumerated example embodiment 63 is a method as described in the method of enumerated example embodiment 34, further comprising updating said thermal state of said projector each time a frame of said image data is received.

Enumerated example embodiment 64 is a method as described in the method of enumerated example embodiment 34, wherein determining said thermal state of said projector includes: receiving a plurality of predefined thermal states spanning the operating temperature range of said projector; and selecting one of said predefined thermal states.

Enumerated example embodiment 65 is a method as described in an image projector comprising: an image data input for receiving image data; a light source operative to emit an illumination beam; illumination optics disposed in the path of said illumination beam and operative to convert said illumination beam into a lightfield; means for adjusting said image data based on a thermal state of said projector to generate thermally adjusted image data; an imaging spatial light modulator coupled to receive said thermally adjusted image data, disposed to receive said lightfield, and operative to modulate said lightfield responsive to said thermally adjusted image data to generate an imaging beam; and imaging optics disposed in the path of said imaging beam and operative to focus said imaging beam on a viewing surface.

Enumerated example embodiment 66 is a method as described in a non-transitory, electronically-readable medium having code embodied therein which, when executed by a processor, will cause an electronic device to: receive image data to be displayed by a spatial light modulator (SLM); determine a thermal state of a projector; adjust said image data based on said thermal state of said projector to generate thermally adjusted image data; and provide said thermally adjusted image data to said SLM.

Enumerated example embodiment 67 is a method as described in a system for configuring a projector for thermal compensation, said system comprising: memory for storing data and code; an image data source configured to provide thermally stabilizing image data and test image data to said projector, said thermally stabilizing image data defining stabilizing images for stabilizing said projector in particular thermal states, said test image data defining a test image; an image capture device configured to capture said test image projected by said projector; and a controller operative to cause said projector to display a first one of said stabilizing images for a time sufficient to stabilize said projector in a first one of said thermal states, cause said projector to display said test image when said projector is in said first one of said thermal states, cause said image capture device to capture an image of said test image projected by said projector when said projector is in said first one of said thermal states, cause said projector to display a second one of said stabilizing images for a time sufficient to stabilize said projector in a second one of said thermal states, cause said projector to display said test image when said projector is in said second one of said thermal states, cause said image capture device to capture an image of said test image projected by said projector when said projector is in said second one of said thermal states, analyze said captured test images to determine changes in an illumination source of said projector associated with said second thermal state relative to said first thermal state; and store a record in said memory associating said changes with said second thermal state.

Enumerated example embodiment 68 is a method as described in the system of enumerated example embodiment 67, wherein certain ones of said stabilizing images each defines a particular uniform intensity across an entire image.

Enumerated example embodiment 69 is a method as described in the system of enumerated example embodiment 68, wherein said particular uniform intensity is a percentage of maximum brightness that corresponds to a particular one of said thermal states.

Enumerated example embodiment 70 is a method as described in the system of enumerated example embodiment 67, wherein at least one of said stabilizing images defines a different uniform intensity for multiple regions across an image.

Enumerated example embodiment 71 is a method as described in the system of enumerated example embodiment 70, wherein each said uniform intensity is a percentage of maximum brightness that corresponds to a particular one of said thermal states associated with each of said regions.

Enumerated example embodiment 72 is a method as described in the system of enumerated example embodiment 67, wherein said record includes data indicative of characteristics of a point spread function associated with a light source of said projector.

Enumerated example embodiment 73 is a method as described in the system of enumerated example embodiment 72, wherein said data indicative of said point spread function includes data indicative of a shape of said point spread function.

Enumerated example embodiment 74 is a method as described in the system of enumerated example embodiment 72, wherein said data indicative of said point spread function includes data indicative of a displacement of said point spread function.

Enumerated example embodiment 75 is a method as described in the system of enumerated example embodiment 74, wherein said data indicative of said point spread function includes data indicative of a shape of said point spread function.

Enumerated example embodiment 76 is a method as described in configuring a projector for thermal compensation, said method including: placing said projector in a first thermal state; causing said projector to display a test image while in said first thermal state; capturing said test image displayed while said projector is in said first thermal state; placing said projector in a second thermal state; causing said projector to display a test image while in said second thermal state; capturing said test image displayed while said projector is in said second thermal state; analyzing said captured test images to determine changes in an illumination source of said projector associated with said second thermal state relative to said first thermal state; and generating configuration data associating said changes with said second thermal state.

Enumerated example embodiment 77 is a method as described in the method of enumerated example embodiment 76, wherein said step of placing said projector in said first thermal state includes causing said projector to display a first predetermined image for a time sufficient to place said projector in said first thermal state.

Enumerated example embodiment 78 is a method as described in the method of enumerated example embodiment 77, wherein said first predetermined image includes a first spatially constant intensity level corresponding to said first thermal state.

Enumerated example embodiment 79 is a method as described in the method of enumerated example embodiment 77, wherein said step of placing said projector in said second thermal state includes causing said projector to display a second predetermined image for a time sufficient to place said projector in said second thermal state.

Enumerated example embodiment 80 is a method as described in the method of enumerated example embodiment 79, wherein: said first predetermined image includes an average intensity level corresponding to said first thermal state; and said second predetermined image includes an average intensity level corresponding to said second thermal state.

Enumerated example embodiment 81 is a method as described in the method of enumerated example embodiment 76, wherein said step of analyzing said captured test images includes determining a point spread function for each of a group of emitters of said illumination source.

Enumerated example embodiment 82 is a method as described in the method of enumerated example embodiment 76, wherein said step of analyzing said captured test images includes: determining a first point spread function associated with said first thermal state for each of said emitters; and determining a second point spread function associated with said second thermal state for each of said emitters.

Enumerated example embodiment 83 is a method as described in the method of enumerated example embodiment 82, wherein said step of generating configuration data includes: storing said first point spread functions in association with said emitters and said first thermal state; and storing said second point spread functions in association with said emitters and said second thermal state.

Enumerated example embodiment 84 is a method as described in the method of enumerated example embodiment 82, wherein said step of analyzing said captured test images includes determining displacements of said second point spread functions relative to corresponding ones of said first point spread functions.

Enumerated example embodiment 85 is a method as described in the method of enumerated example embodiment 76, further comprising: receiving input from thermal sensors associated with said projector; and defining said thermal states based at least partially on said input.

Enumerated example embodiment 86 is a method as described in the method of enumerated example embodiment 76, further comprising: placing said projector in additional thermal states; causing said projector to display a test image while in each of said additional thermal states; capturing said test images while said projector is in each of said additional thermal states; analyzing said captured test images to determine changes in said illumination source of said projector associated with said additional thermal states relative to said first thermal state; and generating configuration data associating said changes with said additional thermal states.

Enumerated example embodiment 87 is a method as described in the method of enumerated example embodiment 76, further comprising providing said configuration data to said projector.

We claim:

1. Apparatus for controlling a spatial light modulator of an image projector, the image projector further comprising an illumination source arranged to illuminate the spatial light modulator, the apparatus comprising:
    an input configured to receive first image data corresponding to a frame of a video;
    a controller in communication with the input, the controller configured to:
    determine a thermal state of the projector based on the first image data,
    generate a model lightfield based on the thermal state of the projector, the model lightfield representing an expected illumination pattern of light incident on the spatial light modulator when illuminated by the illumination source, and
    generate second image data based on the first image data and the model lightfield, the second image data corresponding to the frame of the video; and
    an output configured to output the second image data to the spatial light modulator.

2. The apparatus of claim 1 further comprising an input for receiving sensor data, wherein the controller is configured to determine the thermal state of the projector based on the received sensor data in addition to the first image data.

3. The apparatus of claim 1 wherein the sensor data comprises temperature data, and wherein the temperature data is indicative of at least one of: a temperature within the illumination source; an ambient temperature; or a temperature of optics disposed between the illumination source and the spatial light modulator.

4. The apparatus of claim 1 wherein the controller is further configured to obtain a plurality of intensity values of the first image data, and is configured to use at least the obtained intensity values to determine the thermal state of the projector.

5. The apparatus of claim 4 wherein the controller is configured to determine the thermal state of the projector based on an average of the obtained intensity values in addition to the first image data.

6. The apparatus of claim 1 wherein the controller is configured to determine the thermal state of the projector based on a prior thermal state of the projector in addition to the first image data.

7. The apparatus of claim 1 wherein the illumination source comprises a plurality of emitters arranged in a plurality of groups, each of the groups being associated with a respective portion of the expected illumination pattern.

8. The apparatus of claim 7 wherein the controller is configured to determine respective thermal states of the groups of emitters, and wherein the controller is further configured to determine the thermal state of the projector based on the respective thermal states of the groups of emitters in addition to the first image data.

9. The apparatus of claim 8 wherein the controller is further configured to obtain, from a plurality of different points spread functions, a point spread function which is associated with the thermal state of the projector, and wherein the controller is configured to use at least the obtained point spread function to generate the model lightfield.

10. The apparatus of claim 9 wherein the controller is configured to obtain, from the plurality of different points spread functions, a point spread function which is associated with a group of the plurality of groups, and wherein the controller is configured to use at least the obtained point spread function to generate the model lightfield.

11. The apparatus of claim 9 wherein the controller is further configured to obtain, from the plurality of different points spread functions, respective point spread functions associated with the respective thermal states of the groups of emitters,
    wherein the controller is further configured to convolve the obtained point spread functions, and
    wherein the controller is configured to use at least the convolution of the obtained point spread functions to generate the model lightfield.

12. The apparatus of claim 9 wherein each of the point spread functions has a shape which depends at least on the thermal state with which it is associated.

13. An illumination projector comprising: an apparatus according to claim 1; an illumination source; a spatial light modulator; and optics disposed between the illumination source and the spatial light modulator.

14. A non-transitory, electronically-readable medium having code embodied therein which, when executed by a processor, will configure, in accordance claim 1, an apparatus for controlling a spatial light modulator of an image projector.

15. Apparatus for controlling a spatial light modulator of an image projector, the image projector further comprising an illumination source arranged to illuminate the spatial light modulator, the apparatus comprising:
    an input configured to receive first image data corresponding to a frame of a video;
    a controller in communication with the input, the controller configured to:
    determine a thermal state of the projector based on the first image data,
    select a point spread function based on the thermal state of the projector,
    generate a model lightfield based on the thermal state of the projector and the point spread function, the model lightfield representing an expected illumination pattern of light incident on the spatial light modulator when illuminated by the illumination source, and
    generate second image data based on the first image data and the model lightfield, the second image data corresponding to the frame of the video; and
    an output configured to output the second image data to the spatial light modulator.

* * * * *